US011785431B1

(12) United States Patent
Schlangen

(10) Patent No.: US 11,785,431 B1
(45) Date of Patent: Oct. 10, 2023

(54) INDUSTRIAL MONITORING SYSTEM DEVICE CONNECTION

(71) Applicant: Amazon Technologies, Inc., Seattle, WA (US)

(72) Inventor: Patrick Schlangen, Aachen (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/105,398

(22) Filed: Nov. 25, 2020

(51) Int. Cl.
*H04W 4/38* (2018.01)
*H04W 4/80* (2018.01)
*H04W 88/16* (2009.01)

(52) U.S. Cl.
CPC ............ *H04W 4/38* (2018.02); *H04W 4/80* (2018.02); *H04W 88/16* (2013.01)

(58) Field of Classification Search
CPC .......... H04W 4/38; H04W 4/80; H04W 74/08
See application file for complete search history.

(56) References Cited

U.S. PATENT DOCUMENTS

| | | | |
|---|---|---|---|
| 7,383,478 B1 | 6/2008 | Ballagh et al. | |
| 8,467,779 B2 | 6/2013 | Helfrich | |
| 8,639,981 B2 | 1/2014 | Chong | |
| 10,104,453 B2 | 10/2018 | Mejegard et al. | |
| 10,652,335 B2 | 5/2020 | Botticelli | |
| 10,678,674 B2 | 6/2020 | Hintsala | |
| 11,240,321 B2 | 2/2022 | Flynn, IV et al. | |
| 2007/0121521 A1* | 5/2007 | D'Amico | H04B 7/155 370/252 |
| 2008/0063106 A1* | 3/2008 | Hahm | H04L 1/0003 375/267 |
| 2015/0317565 A1 | 11/2015 | Li et al. | |
| 2016/0094934 A1* | 3/2016 | Yang | H04B 17/318 455/41.2 |
| 2017/0373804 A1* | 12/2017 | Han | H04W 4/70 |
| 2018/0041861 A1* | 2/2018 | Zhang | H04W 48/12 |
| 2018/0324681 A1* | 11/2018 | Yilmaz | H04W 74/00 |
| 2019/0120927 A1* | 4/2019 | Nishimura | H04W 64/00 |
| 2019/0246344 A1* | 8/2019 | Prasad | H04W 4/38 |

(Continued)

FOREIGN PATENT DOCUMENTS

JP 5712991 B2 5/2015

OTHER PUBLICATIONS

Wikipedia, "IEEE 802.11," page last modified Feb. 7, 2017, retrieved Feb. 13, 2017, from https://en.wikipedia.org/Wiki/IEEE_802.11, 9 pages.

(Continued)

*Primary Examiner* — Wen W Huang
(74) *Attorney, Agent, or Firm* — Davis Wright Tremaine LLP

(57) ABSTRACT

An industrial monitoring system comprises a plurality of gateways in transmission range of a monitoring device. A gateway, of the plurality of gateways, receives a first transmission indicating that the monitoring device is requesting to communicate with any one of the plurality of gateways. The gateway determines a signal quality of the received first transmission, and determines a wait time in which at least a portion of the wait time is inversely proportional to the signal quality. After expiration of the wait period, the gateway devices sends, to the monitoring device a second transmission indicating acceptance of the request.

20 Claims, 17 Drawing Sheets

(56) References Cited

U.S. PATENT DOCUMENTS

| | | | |
|---|---|---|---|
| 2019/0289487 A1* | 9/2019 | Hulvey | .................. H04L 69/22 |
| 2020/0027026 A1 | 1/2020 | Cook et al. | |
| 2020/0096996 A1 | 3/2020 | Cella et al. | |
| 2020/0348662 A1 | 11/2020 | Cella et al. | |
| 2020/0403736 A1* | 12/2020 | Lin | ...................... H04W 76/14 |
| 2020/0403877 A1* | 12/2020 | Hayes | .................... H04L 41/12 |
| 2020/0404513 A1* | 12/2020 | Hayes | .................. H04B 17/318 |

OTHER PUBLICATIONS

Wikipedia, "IEEE 802.15.1," Wikipedia, the Free Encyclopedia, retrieved Sep. 21, 2021, https://en.wikipedia.org/wiki/IEEE_802.15, 8 pages.

Cohn et al., "MQTT Version 3.1.1," OASIS, ISO/IEC 20922, Oct. 29, 2014, 81 pages.

* cited by examiner

INDUSTRIAL MONITORING SYSTEM DEVICE CONNECTION

CROSS-REFERENCE TO RELATED APPLICATIONS

This application incorporates by reference for all purposes the full disclosures of co-pending U.S. patent application Ser. No. 17/105,374, filed Nov. 25, 2020, entitled "INDUSTRIAL MONITORING SYSTEM WITH DEBUGGABLE MONITORING DEVICES," and co-pending U.S. patent application Ser. No. 17/105,389, filed Nov. 25, 2020, entitled "INDUSTRIAL MONITORING SYSTEM DEVICE DISLODGEMENT DETECTION."

BACKGROUND

Industrial monitoring systems may provide the ability to track the operational status of the machines and other equipment that is in operation at an industrial site. In some cases, such systems may be able to notify industrial site operators to problems, such as equipment malfunctions, as they arise. However, industrial monitoring systems may themselves be complex and prone to failure.

BRIEF DESCRIPTION OF THE DRAWINGS

Various techniques will be described with reference to the drawings, in which.

DETAILED DESCRIPTION

Figure 1:
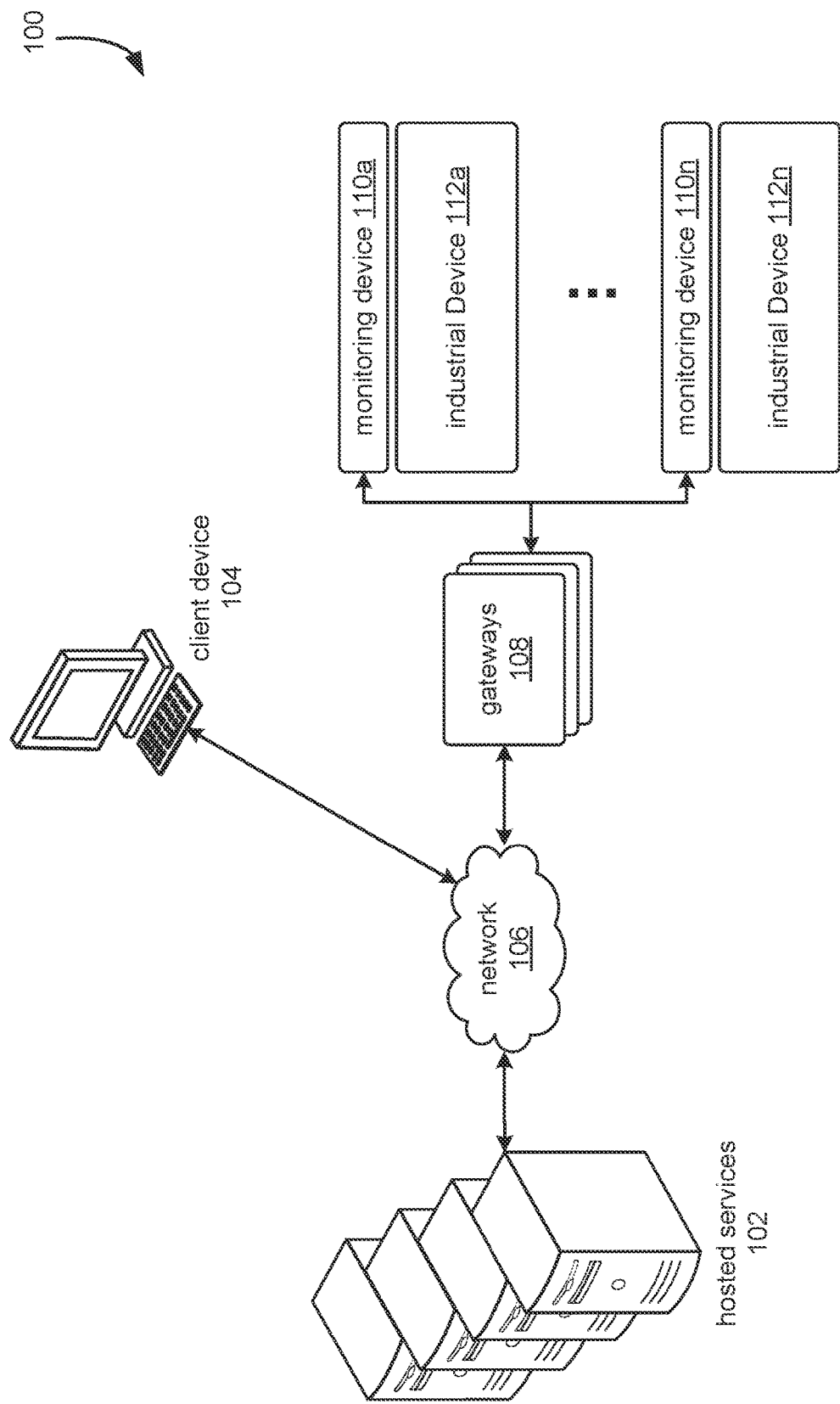
FIG. 1 illustrates an example system for industrial monitoring, in accordance with at least one embodiment.

An example industrial monitoring system includes monitoring devices that are attached to industrial devices operating at a client site, such as a factory or assembly line. The monitoring devices are self-contained devices powered by battery. Each device includes one or more sensors, to collect data such as temperature or vibration data related to the operation of the industrial device to which the monitoring device is attached. This data is routed, via gateway devices also located at the client site, to remote computing services that perform analysis and monitoring. The present document describes techniques related to communication between the monitoring and gateway devices, debugging the monitoring and gateway devices, and detecting a breakdown of a physical bond between a monitoring device and the industrial device to which it is attached.

In an example of the industrial monitoring system, a number of gateways are used at a client site to receive and forward collected sensor data to hosted computing services that will analyze and respond to the data. An example gateway comprises one or more processors and a memory that stores instructions that are executed by the processors. The example gateway also includes a wireless receiver and transmitter. The gateway receives, from a monitoring device, a wireless transmission that indicates that the monitoring device wishes to initiate communication. In an aspect of this example, wireless transmissions between the monitoring device and gateway are compliant with BLUETOOTH. This request to initiate communication may be received by any number of other gateways that are also within range of the monitoring device, and is not directed to any particular gateway.

The example gateway then determines a signal quality of the wireless transmission, and calculates a wait time based on the signal quality. Signal quality may refer to any of a variety of measures that indicate the quality of the received signal, which may include but is not limited to signal strength. The wait time is determined so that it tends to be inversely proportional to the signal quality. For example, at least a portion of the wait time may be determined based on a weighting factor that is scaled in inverse proportion to the signal quality, so that stronger signals tend to have lower wait times, and weaker signals tend to have longer wait times. The wait time may be partially random, but on average will tend to conform to the inverse proportionality just described. Note that inverse proportionality may include result from any of a variety of techniques that cause the wait time, or a portion of the wait time, to tend to be longer when signal quality is poor and shorter when signal quality is high. After the expiration of the wait period, the gateway sends the monitoring device, via a second wireless transmission, an acceptance message that indicates the gateway is able to communicate with the monitoring device. The gateway can then be used by the monitoring device to transmit sensor data to the hosted services.

In a further aspect of this example, the gateway sends the acceptance message after the wait period has expired and it has received, after the wait period, another transmission from the monitoring device. This additional transmission indicates that the monitoring device is still seeking a gateway device to communicate with.

The example gateway just described may improve the power usage characteristics of the monitoring devices, which as noted may have limited battery capacity. The introduction of the wait period tends to result in the monitoring device obtaining a connection to a gateway with which the monitoring device can efficiently communicate.

In another example of an industrial monitoring system, the monitoring devices are debugged using a debug-compatible component that temporarily replaces an existing component in the monitoring device when debugging is to be done. The debug-compatible component comprises a first microcontroller unit that, upon activation, processes information received from one or more sensors; and a second microcontroller unit that, upon activation, performs operations to facilitate debugging. These operations include processing a request to perform a debugging operation, where the request was sent to the monitoring device via a publish-subscribe communications channel. The operations further including causing additional operations associated with the debugging operation to be performed by the first microcontroller unit. The results of the debugging operations are obtained, and are sent, via the publish-subscribe communications channel, to a subscriber of debugging information. Use of these techniques may enable interactive debugging. Here, interactive debugging refers to the use of a debugging application in an interactive session, in which input is received from a user and the results of debugging operations are displayed. Such interactive debugging sessions may simulate, in embodiments, a direct connection between the debugger and application, but as noted, a publish-subscribe communications channel may be used in place of a direct connection. Debugging scripts or batches of debugging commands may also be used. Use of these commands may enable interactive debugging sessions, even when latency between the debugger and monitoring device is high.

In a further aspect of the example, the publish-subscribe communications channel is compliant with at least a subset of message queuing telemetry transport ("MQTT"), and the debug-compatible device comprises a joint test action group ("JTAG") interface. Debug operations are sent to the monitoring device using MQTT, and translated or de-encapsulated internally to executable JTAG commands. In some instances, the supported debugging commands are single-wire debug ("SWD") commands.

In another example, an industrial monitoring system includes a service for monitoring the state of a physical bond between a monitoring device and an industrial device. A component of the industrial monitoring system, such as a computing system implementing a service for analyzing sensor data collected by the monitoring devices, performs operations to determine that the state of the bond may have changed, for example by weakening or breaking. When a monitoring device is attached to an industrial device, the service and monitoring device may enter a commissioning phase in which data obtained from the monitoring device's sensors, such as temperature or vibration data, is used to train a neural network to predict or classify certain characteristics of the data. For example, the neural network may be trained to predict or infer the rate at which temperature will decay, the mass of the industrial device, and so forth. During a subsequent period, after the commissioning phase, data from the monitoring device's sensors is periodically obtained and analyzed to determine if the characteristics of this data match the predicted characteristics. If not, the system may determine that the bond between the monitoring device and the industrial device has been weakened or has broken. The system may then notify the operator of the client site and facilitate the reattachment of the monitoring device to the industrial device.

The monitoring devices, in a further example, are Internet of things ("IoT") devices. An IoT device includes objects which comprise circuitry to perform a networking function and to provide a computing capability. An IoT device may further include objects which, in addition to the networking function and computing capability, are configured to perform some other function. Examples could include, but are not limited to, appliances, equipment, furniture, and lighting.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system for industrial monitoring, in accordance with at least one embodiment. In the example industrial monitoring system 100, a number of industrial devices 112a-112n are located at a client site. The industrial devices 112a-112n may include variety of a variety of devices, including machines, apparatuses, appliances, tools, robots, furniture, mounts, hardware, or constructions.

In the example 100, monitoring devices 110a-n are attached to corresponding industrial devices 112a-n. In at least one embodiment, a monitoring device comprises one or more sensors, such as temperature or vibration sensors, one or more processors, and at least one memory. For example, in at least one embodiment, any one of the monitoring devices 110a-n comprise a temperature sensor, a vibration sensor, a microcontroller, and a computer memory device. In at least one embodiment, a monitoring device comprises at least one processor and a memory storing instructions that, when executed by the at least one processor, cause the monitoring device to perform various functions as described herein.

The monitoring devices 110a-n are attached to the industrial devices 112a-n and, once attached, collect sensor data, such as temperature and vibration data, pertaining to the operation of the industrial device to which the respective monitoring device is attached.

In at least some instances, physical attachment of the monitoring devices, to the industrial devices, is done at the client site. Placement of a monitoring device may be determined according to the structure and operation of the corresponding industrial device. For example, in an industrial device comprising a motor, a monitoring device might be placed on the housing of the motor, in order to facilitate better observation of the motor's temperature or vibration patterns.

In at least some instances, physical attachment of a monitoring device, to an industrial device, is accomplished by creating a bond between the devices using a glue, adhesive, epoxy, or other such material. In other cases, the bond may be created using mechanical means, such as screws, clamps, or magnets. These may, in some cases, be used in addition to or instead of a glue, adhesive, epoxy, or other such material. Note that regardless of the attachment mechanism, the bond may weaken or break over time.

In at least one embodiment, the monitoring devices 110a-n comprise a battery or other power source with limited capacity, compared to typical mains or utility power sources. Consequently, the monitoring devices 110a-n may operate in a manner which preserves limited battery life, or that limits total power consumption. Various techniques for accomplishing this are described herein, e.g., with respect to communications and debugging operations.

In at least one embodiment, the monitoring devices 110 communicate with gateways 108 via wireless transmissions. The wireless transmissions may include various electromagnetic transmissions, such as radio-wave transmissions potentially including but not limited to WiFi transmissions based on the IEEE 802.11 standard or BLUETOOTH transmissions based on the IEEE 802.15.1 standard. In other embodiments, the monitoring devices 110a-n communicate with the gateways via optical communications.

In the example 100, the gateways 108 comprise components to receive and process communications from the monitoring devices 110a-n. For example, in at least one embodiment, a gateway comprises components to process WiFi signals sent from the various monitoring devices 110a-n. In at least one embodiment, a gateway comprises at least one processor and a memory storing instructions that, when executed by the at least one processor, cause the gateway to perform various functions as described herein.

The gateways 108 communicate with the monitoring devices 110a-n to receive information, such as sensor data, that the gateways 108 then forward over network 106 to hosted services 102. The network 106 may comprise components of any of various networking technologies. Such components might include, but are not limited to, routers, other gateways, WiFi access points, and so forth. The network 106 may, in some embodiments, comprise the Internet or other shared communications network. In at least one embodiment, the information is received by the gateway in an encrypted data format, and remains encrypted when forwarded. In another embodiment, the gateway encrypts the data prior to forwarding.

In at least one embodiment, the hosted services 102 comprise one or more services managed by a computing services provider. The one or more services may include shared or dedicated services for analyzing data collected by the monitoring devices 110a-n. Examples of such services include detection of current or impending failures of the industrial devices 112a-n, generation of notifications and procedures for handling such failures, management of the monitoring devices, and so forth. Other services may include data retention and analysis, such as analysis of operating efficiency, factory downtime and work stoppages, failure diagnosis, and so on. Some of these functions may be facilitated by interaction with a client device 104, which may be used by the client to view reports, request analysis, and so forth. The client device 104, in at least one embodiment, comprises a computer, smartphone, tablet, or other computing device. The hosted services 102 may generate various user interfaces and cause those user interfaces to be displayed on the client device 104, in order to display reports, allow the user to request analysis, and so forth.

Figure 2:
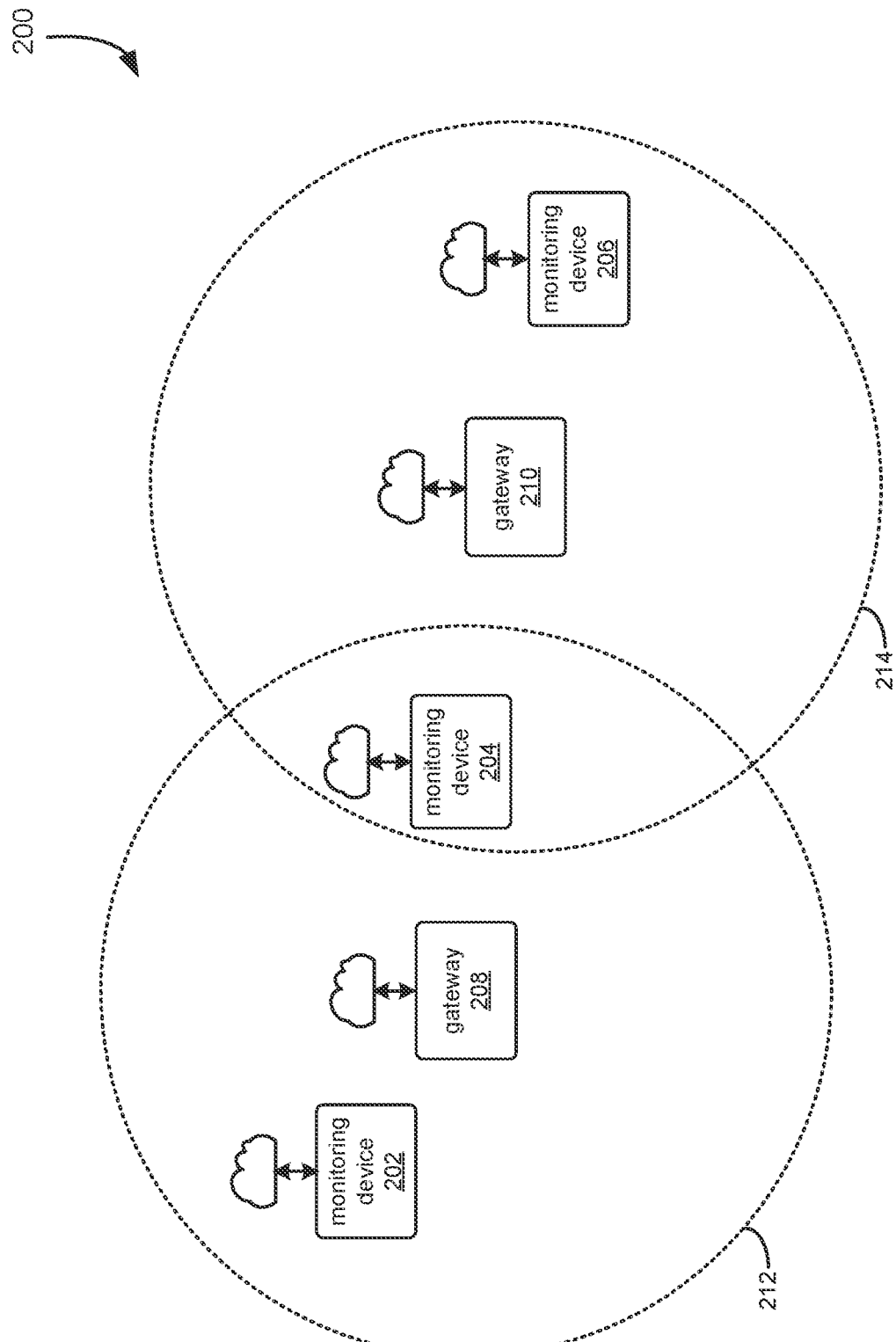
FIG. 2 illustrates an example of initiating communication between a gateway and a monitoring device, in accordance with at least one embodiment.

FIG. 2 illustrates an example of initiating communication between a gateway and a monitoring device, in accordance with at least one embodiment. In the example 200 of FIG. 2, gateways 208, 210 are positioned at a client site among monitoring devices 202, 204, and 206. The gateways and monitoring devices depicted in FIG. 2 may correspond to the gateways and monitoring devices depicted in FIG. 1. Each of the gateways 208, 210 has respective ranges 212, 214 of wireless communication. As depicted in FIG. 2, these ranges may overlap. Accordingly, while some monitoring devices 202, 206 may each be within range of only one gateway, other monitoring devices, such as the depicted monitoring device 204, may fall within the communication ranges of multiple gateways 208, 210.

In practice, the wireless communications ranges of the gateways and monitoring devices may overlap such that a given monitoring device is within communication range of a number of gateways. This situation can lead to the monitoring device establishing a connection whose qualities, including power consumption, are less than could be achieved by connecting to a different gateway. For example, in FIG. 2, a monitoring device 204 is relatively close to gateway 208, and consequently the monitoring device 204 would likely be able to achieve a more power-efficient connection to this gateway 208 than to another gateway 210 that is farther away. However, the use of certain conventional connection protocols may increase the likelihood that the monitoring device 204 will connect to the gateway 210 that is farther away. For example, in one approach to obtaining a connection, the monitoring device 204 sends periodic messages advertising the intention of the monitoring device 204 to communicate with any one of a plurality of gateways 208, 210. Any one of the gateways 208, 210 may respond to such messages, and thereby trigger the establishment of the connection. The farther gateway 210 may respond first, resulting in a less power-efficient connection than there would have been had the closer gateway 208 responded first.

In at least one embodiment, the gateways 208, 210 wait for a period of time before responding to the connection advertisements. The wait period is calculated based on some measure of signal quality, and is inversely proportional to the measure, so that higher-quality signals have, or tend to have, shorter wait times. Here, inverse proportionality generally refers to wait times tending to be lower when signal quality is high, and longer when signal quality is poor. For example, in at least one embodiment, signal strength is used as a measure of signal quality, and stronger signals result in wait times that tend to be lower. In at least some embodiments, the wait time is randomized but weighted such that higher-quality signals tend to result in shorter wait times, and lower-quality signals tend to result in longer wait times.

Figure 3:
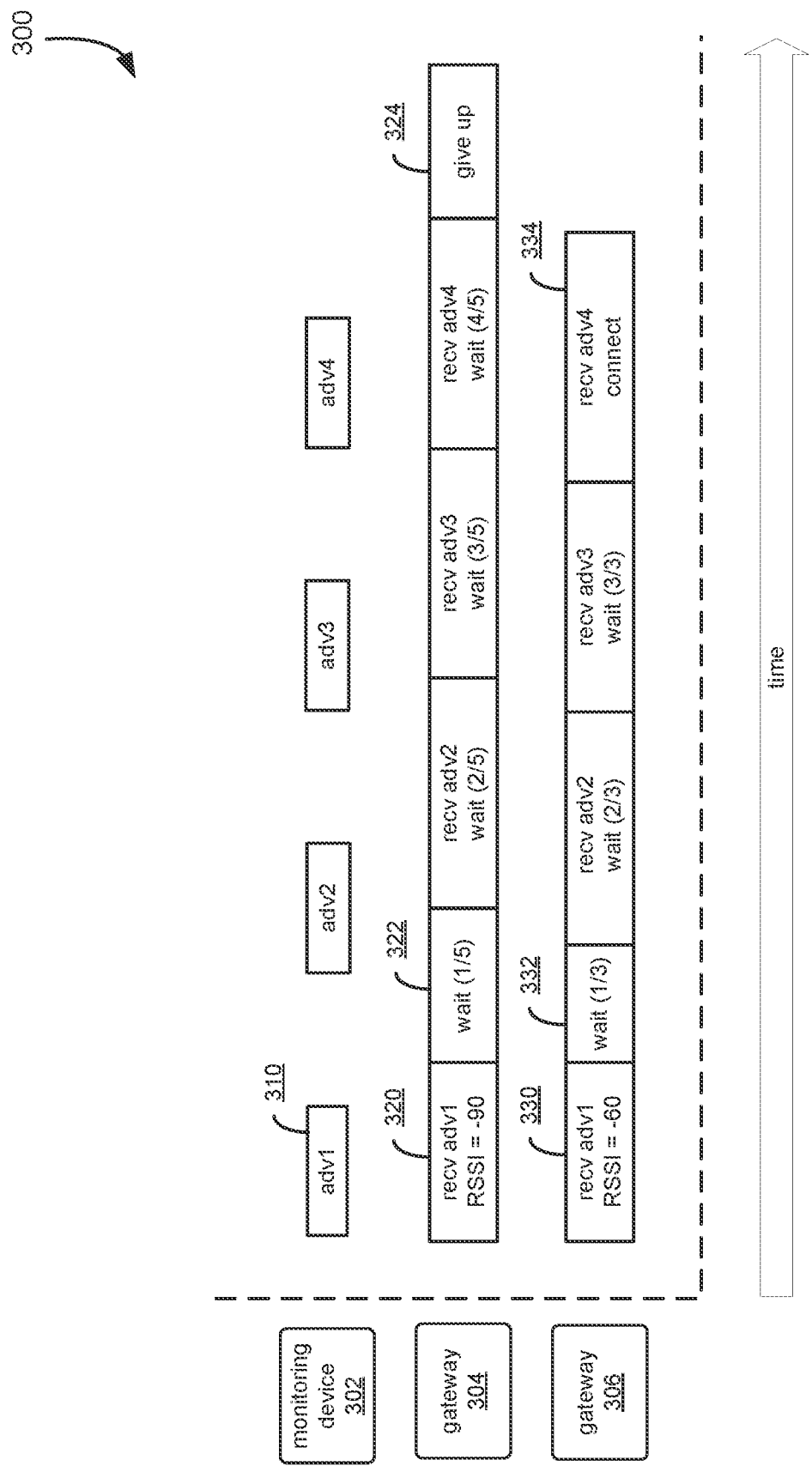
FIG. 3 illustrates an example of connection arbitration between a plurality of gateways and a monitoring device seeking to communicate with any one of the plurality of gateways, in accordance with at least one embodiment.

This connection process may be further understood in view of FIG. 3, which illustrates an example of connection arbitration between a plurality of gateways and a monitoring device seeking to communicate with any one of the plurality of gateways, in accordance with at least one embodiment. In the example 300, a monitoring device 302 is attempting to establish communications with any one of the gateway devices 304, 306. It is presumed, for the purpose of providing an illustrative example, that communication between the monitoring device 302 and the first gateway 304 would be somewhat less efficient than communication between the monitoring device 302 and the second gateway 306.

In at least one embodiment, the monitoring device 302 attempts to initiate wireless communication with any one of the gateway devices 304, 306 by transmitting periodic advertising messages. These indicate that the monitoring device 302 wishes to establish a connection. For example, in at least one embodiment, the wireless communication is compatible with aspects of the BLUETOOTH protocol, and the monitoring device 302 periodically transmits ADV_INV messages until it receives a response. In the example 300, the periodic advertising messages 310 are depicted as "adv1," "adv2," "adv3," and "adv4."

After the monitoring device 302 transmits "adv1," the "adv1" message may be received by the first gateway 304 with a received signal strength indicator ("RSSI") of −90 dBm, as indicated by the "recv adv1" event 320. At about the same time, the "adv1" message may also be received by the second gateway 306 with an RSSI of −60 dBm. It will be appreciated that these examples of signal strength are intended to be illustrative, and as such should not be construed in a manner which would limit the scope of potential embodiments.

In the example 300, the first gateway 304 calculates a wait period based on the signal strength of the "adv1" message as received, −90 dBm. In at least one embodiment, the wait period is at least partially random, but weighted so that it will tend to be longer for weaker signal strengths. In the example, the "adv1" signal received by the first gateway 304 is relatively weak, and its wait period is consequently relatively long. During this period, illustrated as "wait 1/5" 322 to "wait 5/5," the gateway 304 receives several additional advertising messages, but does not respond since the full wait period has not yet expired. After the wait period, the first gateway 304 does not receive an additional advertising message, and gives up 324. In at least one embodiment, the first gateway does not respond to the monitoring device unless it receives an advertising message subsequent to the expiration of its calculated wait period.

The second gateway also calculates a wait period after receiving adv1 at 330. In this example, the wait period is calculated based on the signal strength of the "adv1" message 330 as received, −60 dBm. The second gateway 306 also calculates its wait period as random, weighted in the same fashion as the first gateway. The randomized calculation could, in some cases and embodiments, result in a wait period that is longer for the second gateway 306 than the first gateway 304, even though the "adv1" message was received by the second gateway with better signal strength. For the illustrative purpose of this example, the calculated wait period is presumed to be shorter than for the first gateway 304. This is illustrated by the wait periods from the first wait period 332 "wait 1/3" to the end of the wait period, "wait 3/3." The second gateway 304 calculates the wait period upon receiving "adv1" and begins waiting during period "wait 1/3" 332. During "wait 2/3," the second gateway 304 receives "adv2," and during "wait 3/3" it receives "adv3." The second gateway's wait period has then expired, so when it receives "adv4," in at least one embodiment, it responds by sending a "connect" message, at 334, back to the monitoring device 302.

In at least one embodiment, there are technical advantages to weighting or otherwise skewing the wait time so that stronger signal strengths correlates to shorter wait times, and weaker signal strengths correlate to longer wait times. These advantages include causing the monitoring device to connect to a gateway whose quality and power consumption characteristics are better than might otherwise be achieved.

In at least one embodiment, the randomization of the wait period helps avoid collisions, including those situations in which more than one gateway responds to the same advertising message. This may further reduce power consumption, since the monitoring device may avoid having to respond to more than one message indicating a gateway's availability to connect.

In at least one embodiment, there are technical advantages to having the gateway respond to an advertising message received after the wait period has expired. This advertising message indicates that the monitoring device is still seeking a connection. In the example 300, the first monitoring device 304 waits for its calculated time period ("wait 1/5" through "wait 5/5"), but never receives another advertising message, and never responds to the monitoring device. The second monitoring device 306, on the other hand, receives "adv4" after its shorter wait period has expired, and does respond. Consequently, fewer gateway devices will respond to the monitoring device 302, and the monitoring device's battery power, or other resources, are preserved.

Figure 4:
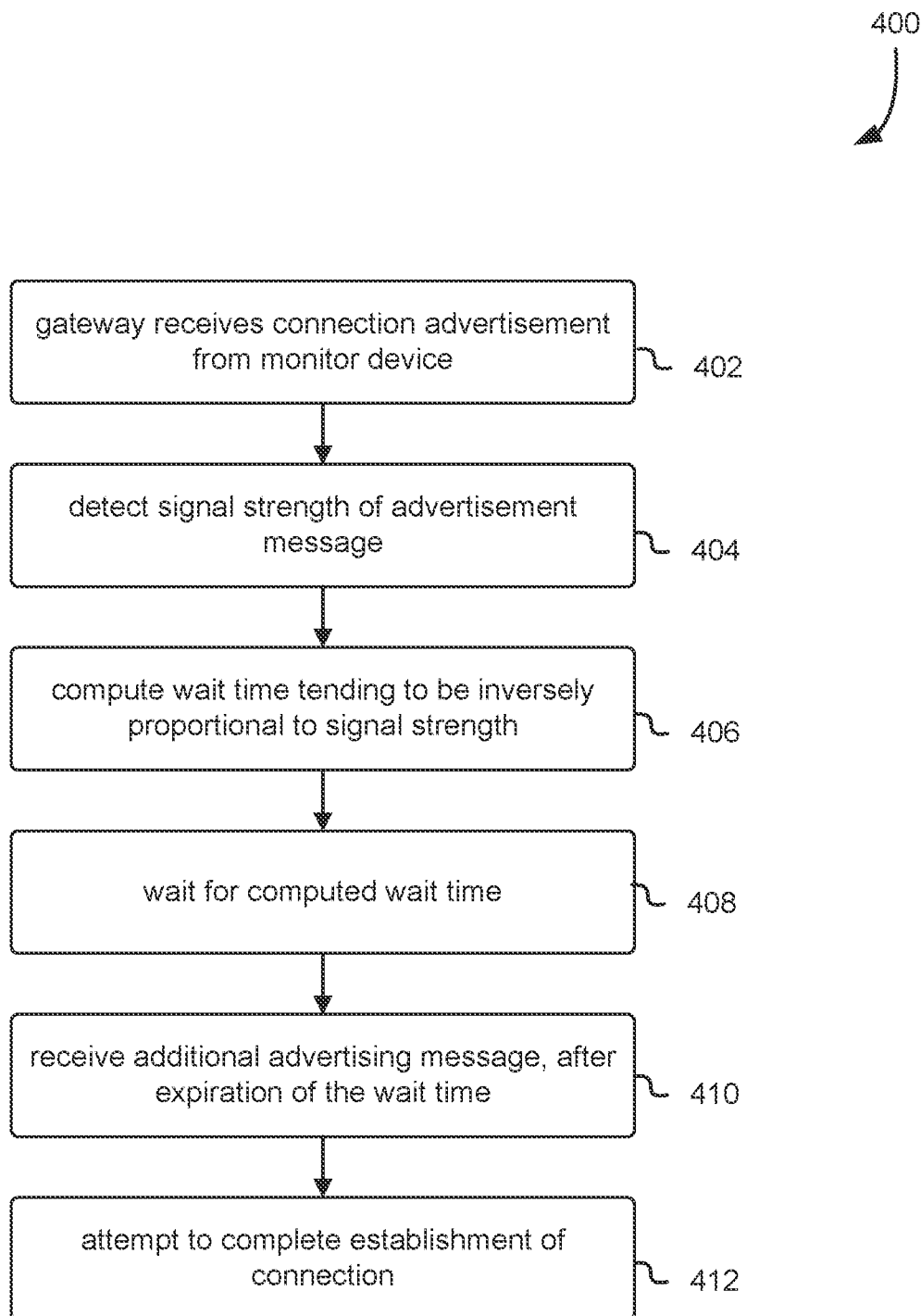
FIG. 4 illustrates an example process of initiating a connection between a gateway and a monitoring device seeking to communicate with any one of a plurality of gateways, in accordance with at least one embodiment.

FIG. 4 illustrates an example process 400 of initiating a connection between a gateway and a monitoring device seeking to communicate with any one of a plurality of gateways, in accordance with at least one embodiment. Although FIG. 4 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 4 are performed by one or more components of an industrial monitoring system, such as the system depicted in FIG. 1. In at least one embodiment, the operations depicted in relation to FIG. 4 are performed by a gateway, such as any one of the gateways depicted in FIG. 1.

At 402, a gateway device receives a connection advertising message from a monitoring device.

At 404, the gateway device detects the signal strength of the advertising message, as it was received by the gateway device.

At 406, the gateway device computes a wait time tending to be inversely proportional to the signal strength.

At 408, the gateway device waits for the computed wait time.

At 410, the gateway device receives an additional advertising message, from the same gateway device, after the expiration of the wait time.

At 412, the gateway device responds to the additional advertising message by attempting to complete the establishment of the connection. In at least one embodiment, the gateway device does this by sending a message back to the monitoring device to indicate that a connection can be established between the two devices.

In at least one embodiment, the operations described in relation to FIG. 4 are performed with or applied to a system other than an industrial monitoring system. For example, in at least one embodiment, the techniques described above may be performed in a system for debugging any of a variety of IoT devices, including but not limited to the described monitoring device. In cases, the described techniques may be used in relation to a system of IoT devices that performs some function other than, or in addition to, industrial monitoring.

Figure 5:
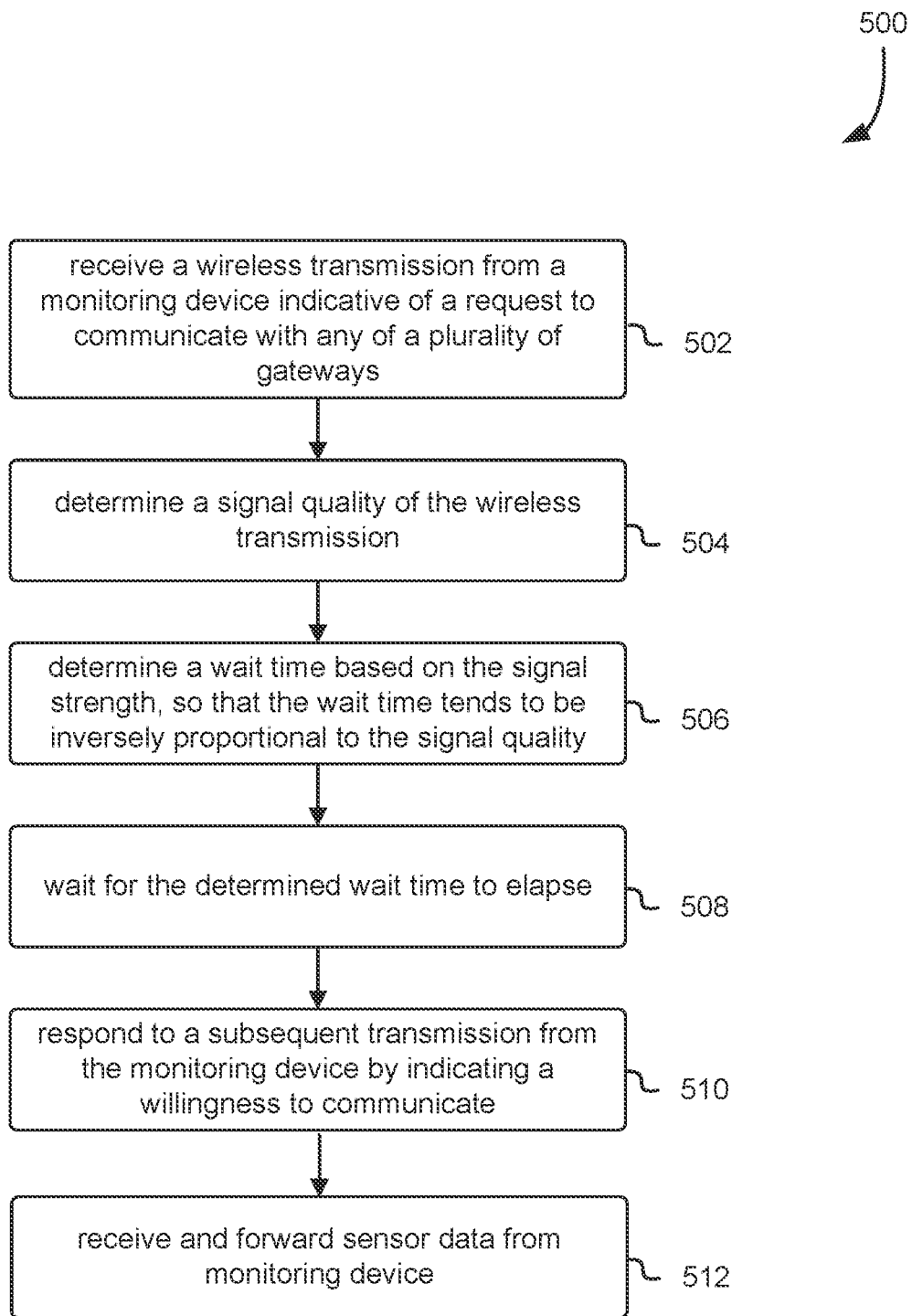
FIG. 5 illustrates another example of a process of initiating a connection between a gateway and a monitoring device seeking to communicate with any one of a plurality of gateways, in accordance with at least one embodiment.

FIG. 5 illustrates another example of a process 500 of initiating a connection between a gateway and a monitoring device seeking to communicate with any one of a plurality of gateways, in accordance with at least one embodiment. Although FIG. 5 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 5 are performed by one or more components of an industrial monitoring system, such as the system depicted in FIG. 1. In at least one embodiment, the operations depicted in relation to FIG. 4 are performed by a gateway, such as any one of the gateways depicted in FIG. 1.

At 502, the gateway receives a wireless transmission from a monitoring device. The transmission indicates that the monitoring device is requesting communication with any one of a plurality of gateways. For example, as depicted in FIG. 2, a given monitoring device may be within communication range of any number of gateways with which communication would be possible. The monitoring device generally initiates communication with a gateway so that it can transmit information through the gateway to some other destination, such as to the hosted services depicted in FIG. 1. The monitoring device could use any of the available gateways to accomplish this task. However, as described herein, the gateway with which the monitoring device communicates may have an impact on the amount of power consumed by the monitoring device to accomplish the task.

At 504, the gateway determines a signal quality of the wireless transmission. Signal quality refers to the quality of the signal as it is received by the gateway. As described herein, signal strength may be measured in a variety of ways, including but not necessarily limited to signal strength. For example, signal strength may be measured by in terms of RSSI, or some similar measure.

At 506, the gateway determines a wait time based on the signal quality. The wait time is determined so that the wait time tends to be inversely proportional to the signal quality. In at least one embodiment, this is done by making at least a portion of the signal dependent upon a randomized factor that is weighted in inverse proportion to the signal strength, so that on average, lower signal quality produces larger wait times and higher signal quality produces shorter wait times.

At 508, the gateway waits for the determined wait time to elapse.

At 510, the gateway response to a subsequent transmission from the monitoring device by indicating a willingness to communicate. When this operation is included in an embodiment, it is performed after the wait time has elapsed. As such, the subsequent transmission is one that is received after the wait time has elapsed. By also waiting for the subsequent transmission, the gateway reduces the possibility that the gateway will attempt to complete the connection with the monitoring device when some other gateway has already done so.

At 512, the gateway receives and forwards sensor data that was received from the monitoring device, based on the connection established in the preceding operations.

Figure 8:
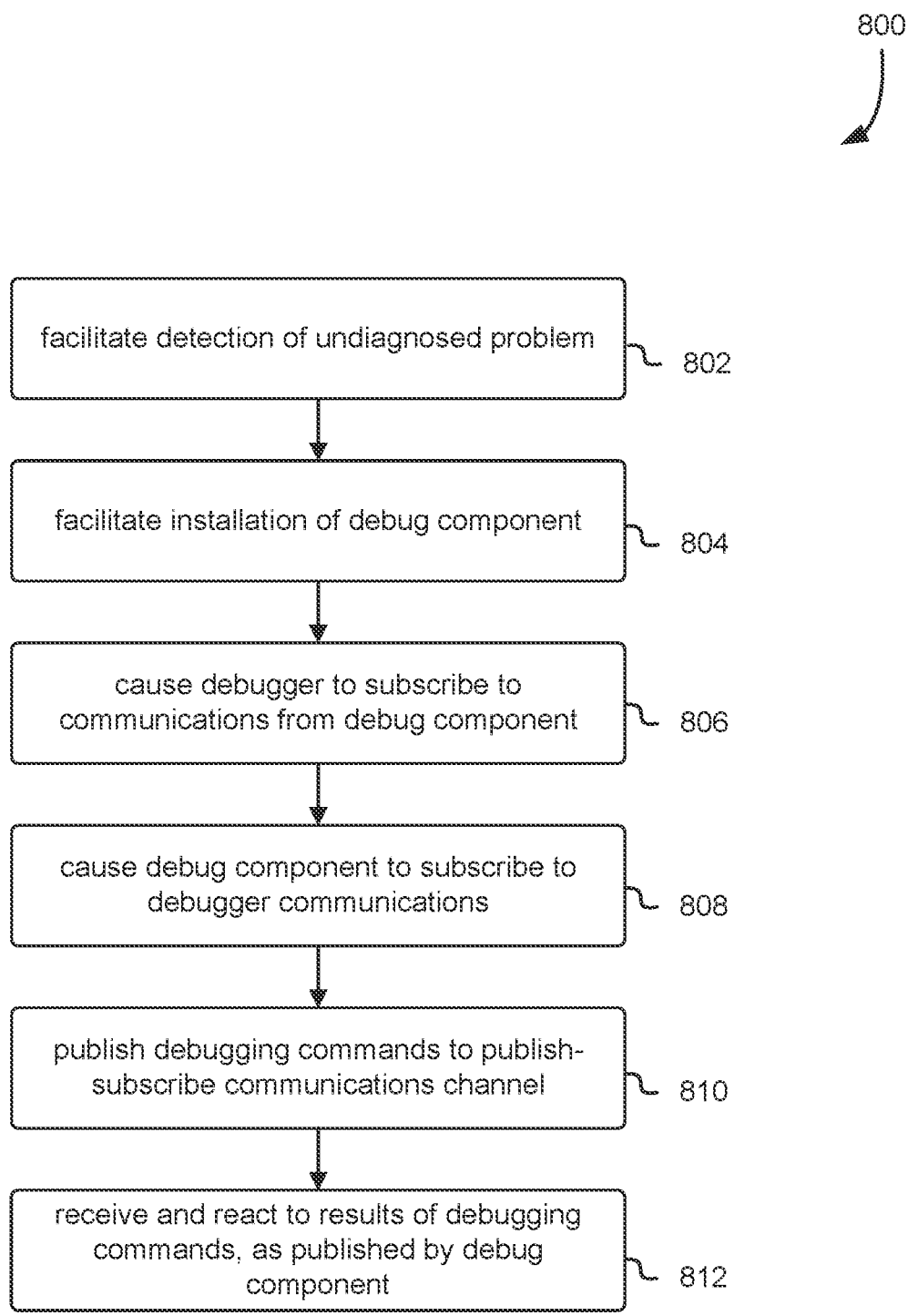
FIG. 8 illustrates an example process for remote debugging of industrial monitoring devices, in accordance with at least one embodiment.

In at least one embodiment, the operations described in relation to FIG. 8 are performed with or applied to a system other than an industrial monitoring system. For example, in at least one embodiment, the techniques described above may be performed in a system for debugging any of a variety of IoT devices, including but not limited to the described monitoring device. In cases, the described techniques may be used in relation to a system of IoT devices that performs some function other than, or in addition to, industrial monitoring.

In an example embodiment, a method of facilitating power-efficient communication between a monitoring device and a gateway comprises receiving a first wireless transmission indicative of a request from a monitoring device to communicate with any one of a plurality of gateways. The method further comprises calculating a wait time based, at least in part, on signal strength (or some other measure of signal quality) of the wireless transmission. At least a portion of the wait time is calculated so as to be inversely proportional to the signal strength. The method further comprises sending, after the wait time has elapsed, a second wireless transmission that indicates acceptance of the request to communicate.

In a further aspect of the example method, the wait time includes a portion which is a randomized delay period that is inversely proportional to the signal strength. This portion may correspond to the portion of the wait time referred to in the preceding paragraph.

In a further aspect of the example method, the plurality of gateways are in wireless transmission range of the monitoring device. Consequently, each of the plurality of gateways may receive and process the first wireless transmission, though the signal strength of the transmission, as received by the gateway, will vary.

In a further aspect of the example method, the monitoring device periodically transmits additional requests to communicate with any one of the plurality of gateways. These are received by the gateway, which, according to the sample method, responds to respond to the additional request to communicate with any one of the plurality of gateways by at least determining whether the wait time has elapsed and sending the second wireless transmission. Doing so reduces the chance that the gateway will send an acceptance message to the monitoring device after the monitoring device has already received an acceptance from some other gateway, and may further reduce the monitoring device's power consumption.

A further aspect of the example method comprises receiving, from the monitoring device, information that is obtained from a sensor included in the monitoring device. Examples of sensor data include temperature and vibration data.

A further aspect of the example method comprises receiving sensor information from the monitoring device, the sensor information received after acceptance of the request from the monitoring device; and sending the sensor information to a remote service.

In a further aspect of the example method, power consumption of the monitoring device is reduced based, at least in part, on delaying transmission of the message indicative of acceptance of the request to communicate. Power consumption by the monitoring device may be further reduced by waiting for both the expiry of the wait time and receipt, subsequent to the expiry, of a message indicating that the monitoring device is still awaiting a connection.

In another embodiment, a non-transitory computer-readable storage medium comprising instructions that, in response to execution by at least one processor of a computing device, cause the computing device to at least perform the example method, or any aspect or combination of aspects, just described.

Figure 6:
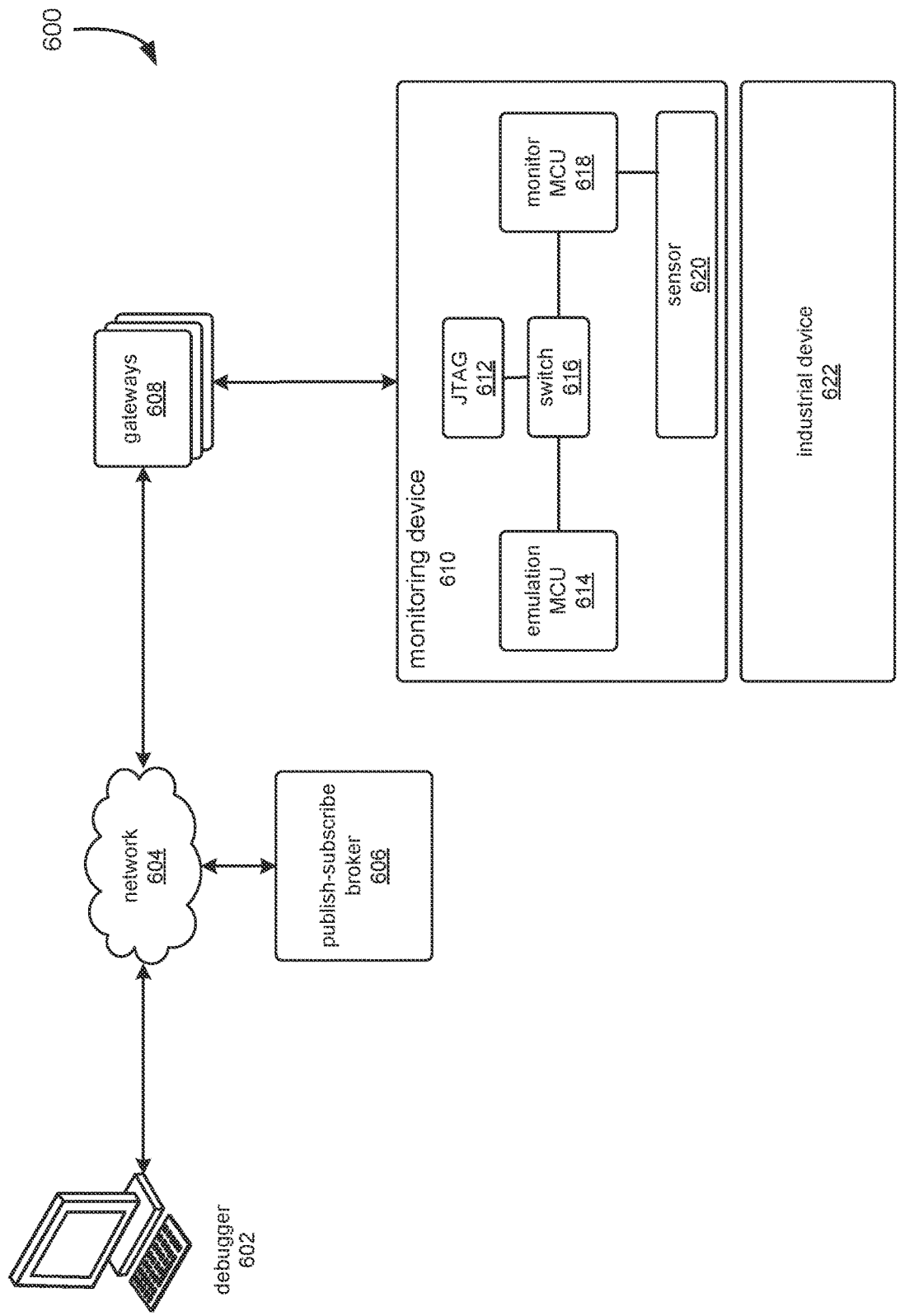
FIG. 6 illustrates an example of an industrial monitoring system enabled for remote debugging, in accordance with at least one embodiment.

FIG. 6 illustrates an example of an industrial monitoring system enabled for remote debugging, in accordance with at least one embodiment. In particular, the example 600 depicts a scenario in which the operation of software or hardware of a monitoring device 610 is to be examined using a debugger 602. The example monitoring device 610 may correspond to any one of the monitoring devices 110a-n that are depicted in FIG. 1. However, in order to debug the operation of a monitoring device 610, some or all of its circuitry components may be substituted with a debugging-compatible version of the circuitry.

Figure 7:
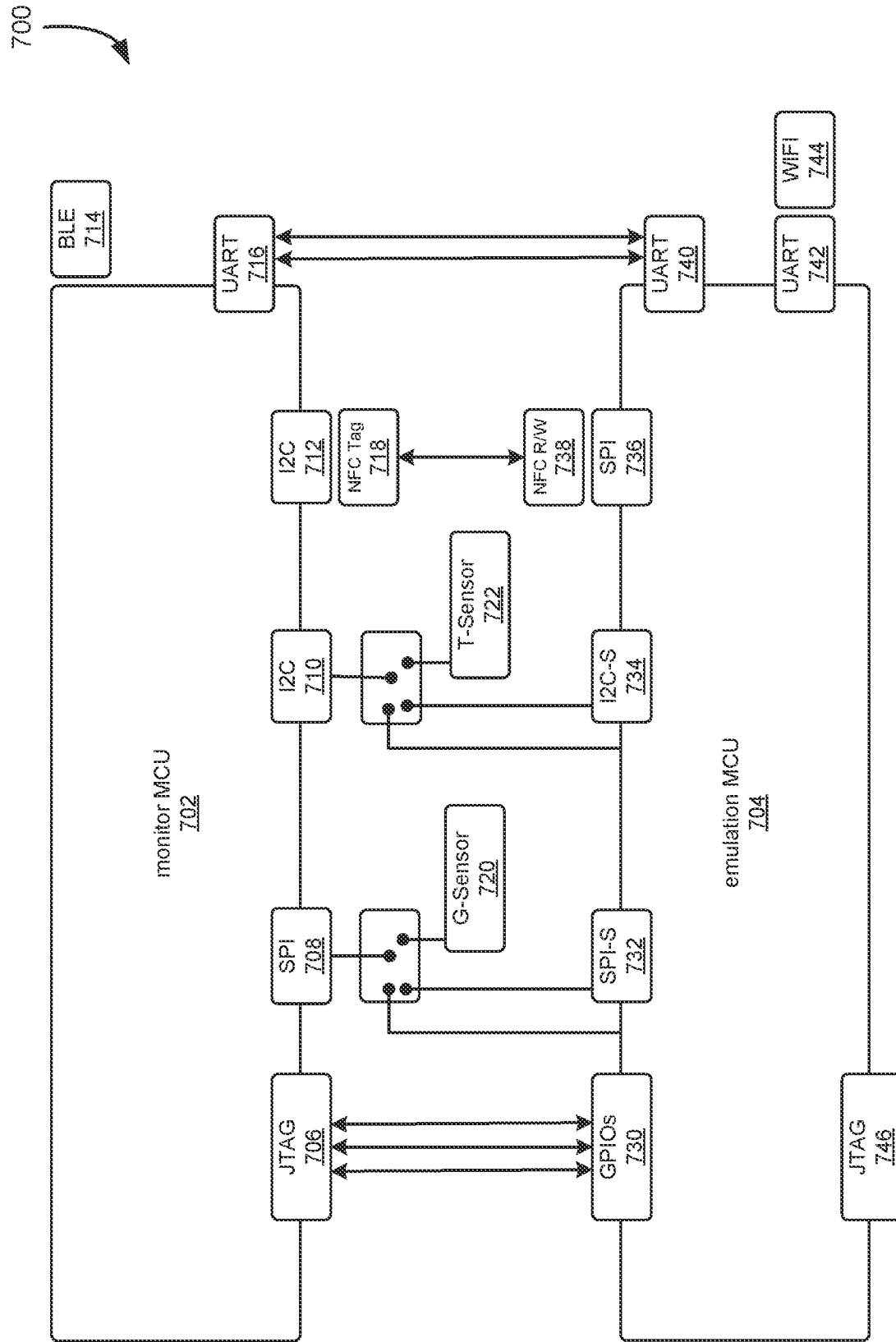
FIG. 7 illustrates an example of a debug-enabled component for a monitoring device, in accordance with at least one embodiment.

In at least one embodiment, non-debugging versions of a monitoring device's circuitry are protected, so that access to information about their internal operation is limited or, in some cases, extensively or completely restricted. Accordingly, a process of debugging the operation of a monitoring device may initially involve replacing the circuitry in the monitoring device that is not compatible with the debugging process with other circuitry that is debug-compatible. FIGS. 6 and 7 depict examples of debug-compatible circuitry for a monitoring device. This circuitry, in at least one embodiment, comprises a circuit board which can be swapped into the monitoring device in order to enable debugging.

In at least one embodiment, a non-debug version of a monitoring device 610 comprises one or more sensors and a microcontroller unit ("MCU"). In order to debug the monitoring device 610, debug-compatible circuitry can be swapped into the monitoring device 610 while it remains attached to the industrial device 622. In at least one embodiment, the monitoring device 610 is designed so that the circuitry can be swapped without removing the monitoring device 610 from the industrial device 622.

The debug-compatible circuitry contains sensors 620 and a monitor MCU 618. In at least one embodiment, these correspond to the circuitry in the non-debug-compatible version, and generally perform the same functions. In at least one embodiment, the debug-compatible circuitry further comprises an emulation MCU 614, a switch 616, and a debugging interface, such as the depicted Joint Action Test Group ("JTAG") interface 612.

In at least one embodiment, a microcontroller unit, such as monitor MCU 618 or emulation MCU 614, comprises at least one process and at least one memory for storing data or processor-executable instructions. In at least one embodiment, the microcontroller is equivalently substituted by a system-on-a-chip ("SoC") or by a set of discrete components, such as discrete processors or memories.

In at least one embodiment, the JTAG interface is a debug port implementing a serial interface. The JTAG interface may be coupled with additional internal firmware or other circuitry to enable various observational and control functions over the components of the monitoring device, including but not necessarily limited to the operation and registers of the monitor MCU 618. In at least one embodiment, functions of the JTAG interface can include, in various cases and embodiments, boundary scan testing, firmware programming, setting and stepping over breakpoints, inspecting registry values, rebooting the device, or other similar operations.

In at least one embodiment, the JTAG interface is a serial-wire debug ("SWD") interface. SWD interfaces are sometimes referred to as single wire debug interfaces. SWD interfaces generally comprise fewer wires or pins than other JTAG interfaces, including as few as two pins.

In at least one embodiment, monitor MCU 618 communicates with sensor 620 to obtain sensor data relevant to the industrial device 622, such as temperature or vibration data. This data may then be processed and communicated to an external system for processing. Example embodiments of a system that performs these operations are described in relation to FIG. 1.

As described herein, embodiments of the monitoring device 610 may have limited battery life, or may otherwise be constrained by limits on total power consumption. Accordingly, the depicted example 600 reflects various adaptations that may be made in order to lower power consumption by the monitoring device 610.

In at least one embodiment, communication between the monitoring device 610 and debugger 602 is made via one or more gateways 608 and a network 604. The gateways and network may correspond to those depicted in FIG. 1.

In at least one embodiment, the debugger 602 comprises a computing device and a debugging program. The debugging program performs functions related to the debugging process. These can include operations such as issuing commands to retrieve register values, obtain memory dumps, stack traces, step through program execution, and so on. It will be appreciated that these examples are intended to be illustrative, and that the examples should not be construed in a manner which would limit the scope of potential embodiments to only those that incorporate the specific examples provided.

In at least one embodiment, the latency of the network 604, or of the gateways 608, may be relatively high, and interferes with debugging operations. Further, communication between the debugger 602 and monitoring device 610 may consume significant amounts of power.

In at least one embodiment, a publish-subscribe communications broker 606 facilitates communication between the debugger 602 and the monitoring device 610. In at least one embodiment, this reduces power consumption compared to other communications techniques, such as direct TCP/IP communication between the debugger 602 and monitoring device 610.

The publish-subscribe communications broker 606, in at least one embodiment, serves as a component of a publish-subscribe communications channel. The publish-subscribe communications channel receives information provided by data publishers, and distributes that information to subscribers. The data is distributed according to topic. In at least one embodiment, when information is published, it is associated with one or more tags that define the topic of the data. To subscribe to data, a subscriber indicates which topics it is interested in. A communications broker 606, in at least one embodiment, correlates between the published data and the subscribers, and delivers the information as appropriate.

In at least one embodiment, communication between publishers and subscribers is asynchronous. A data publisher submits a request, to the publish-subscribe communications channel, to publish data associated with one or more topics.

The request completes before being delivered asynchronously. The communications broker 606 identifies subscribers who have indicated interest in receiving data with the assigned topics, delivers the data to those subscribers. The use of this mechanism may convey a variety of technical advantages. In some cases, power consumption by the monitoring device 610 is reduced, due to the use of asynchronous communications. In addition, scalability may be improved, since the use of this mechanism may make it easier to communicate with or control larger numbers of monitoring devices.

In at least one embodiment, the publish-subscribe communications channel is implemented using message queueing telemetry transport ("MQTT"), or using a compatible subset. In at least one embodiment, the publish-subscribe communications channel conforms to aspects of the ISO/IEC 20922 standard. Note that although the term MQTT is partially based on the phrase "message queuing," not all implementations rely on or include message queues. Generally speaking, MQTT is a lightweight, publish-subscribe communications mechanism that may be useful in conjunction with various IoT applications.

In at least one embodiment, the publish-subscribe broker 606 comprises one or more computing devices that implement a publish-subscribe communications channel, such as a channel based on MQTT. In some embodiments, the gateways 608 implement the functionality of the publish-subscribe broker 606. In other embodiments, the broker 606 is a standalone component, or fleet of components. In still other embodiments, the broker 606 is implemented by a computing resource service provider.

In at least one embodiment, the emulation MCU 614 executes commands to cause the monitoring device 610 to perform operations and commands related to debugging. In at least one embodiment, this includes causing the monitoring device 610 to subscribe to receive debugging commands via the publish-subscribe communications broker 606. The emulation MCU 614 might, for example, execute commands to cause the monitoring device 610 to subscribe to events pertaining to topics such as DEBUG_COMMANDS and <id>, where <id> is a unique identifier of the monitoring device. It will be appreciated that these examples of signal strength are intended to be illustrative, and as such should not be construed in a manner which would limit the scope of potential embodiments. These topics may be combined with a logical AND operator, so that the monitoring device only receives debugging commands that are intended for it.

In at least one embodiment, the emulation MCU 614 responds to debugging commands by performing preliminary processing tasks. These may include, in various embodiments, parsing, identifying and extracting parameters, implementing control flow, and so on.

In at least one embodiment, debugging commands are sent to the monitoring device 610 as scripts or batches of commands. This approach may convey a technical advantage, in that it facilitates the execution of related debugging operations while avoiding round-trips between the debugger 602 and the monitoring device 610. For example, a debug script may contain commands to perform a series of operations, commands to conditionally execute certain operations, commands to perform data processing (e.g., to limit the amount of data returned by the result of the debug command), and so on. Including support for the use of the debug script in the monitoring device 610 may therefore achieve effects such as improving debugging speed, particularly when network latency is high, and improving battery life or power consumption of the monitoring device 610, due to the reduced number of round-trips used to perform a given set of debugging operations.

In at least one embodiment, the emulation MCU 614 emulates operations of the monitor MCU 618. The emulation MCU 614 may, in some cases and embodiments, perform initial processing of incoming commands or signals received via inputs to the monitoring device 610. This may include, in at least one embodiment, data from the sensor 620.

In at least one embodiment, JTAG commands are encapsulated in MQTT messages. This may be described as wrapping JTAG commands in MQTT messages. These commands can include system resets, configuration resets, flash programming, boundary scans, program download, test access port ("TAP") commands, and so on.

In at least one embodiment, a JTAG command is encapsulated in an MQTT message by encoding the command in the payload portion(s) of one or more MQTT message packets. For example, a debug command may be encapsulated in the MQTT message packet(s) associated with an MQTT "PUBLISH" message. The PUBLISH message may further include one or more topics. The publish-subscribe broker 606, in at least one embodiment, filters and/or routes the MQTT message to the monitoring device 610 based on the assigned topics.

In at least one embodiment, translation between MQTT and JTAG occurs externally to the monitoring device 610, while in other embodiments the translation is performed internally. For example, in at least one embodiment, the gateways 608 or the broker 608 translates or de-encapsulates the MQTT message just prior to sending the message to the monitoring device 610. In another embodiment, the emulation MCU 614 receives the MQTT data via a wireless communications module, and then de-encapsulates the MQTT data into a JTAG-format debugging command.

FIG. 7 illustrates an example of a debug-enabled component for a monitoring device, in accordance with at least one embodiment. In at least one embodiment, the example component 700 of FIG. 7 comprises a circuit board or other component containing the depicted circuitry.

In at least one embodiment, the component 700 comprises a monitor MCU 702 and an emulation MCU.

In at least one embodiment, the monitor MCU 702 comprises a JTAG interface 706 coupled to a general purpose input/output ("GPIO") interface 730 of the emulation MCU 704, a serial peripheral interface ("SPI") 708, an inter-integrated circuit ("I2C") interface 710 coupled to a temperature sensor 722, an I2C interface 712 coupled to an NFC tag 718, a universal asynchronous receiver transmitter ("UART") interface 716 coupled to a UART interface 740 on the emulation MCU 704, and a BLE (BLUETOOTH) interface 714. In other embodiments, certain of these components may be omitted or replaced. For example, in at least one embodiment, SPI 708, i2C 710, I2C 712, NFC Tag 718 are omitted. Likewise, in some cases G-Sensor 720 and T-Sensor 722 may be omitted, or replaced with other components.

In at least one embodiment, the emulator MCU 704 comprises general-purpose input GPIO interface 730 coupled to the JTAG interface 706 of the monitor MCU 702, SPI-S interface 732 coupled to a vibration or G-Sensor 720, I2C-S interface 734 coupled to a temperature sensor 722, SPI interface 736 coupled to an NFC R/W module 738, a UART interface 740 coupled to a UART interface 716 on the monitor MCU 702, a UART interface 742 coupled to a WIFI module 744, and a JTAG interface 746. In other embodiments, certain of these components may be omitted or replaced. For example, in at least one embodiment, SPI-C 732, I2C 734, SPI 736, and NFC R/W 738 are omitted.

In at least one embodiment, MQTT messages are received via the WIFI module 744 and UART interface 742. The MQTT messages are processed by the emulation MCU. This processing can, in some cases, include de-encapsulating JTAG debugging commands and sending the commands to the monitoring MCU 702 via the GPIO interface 730 on the emulation MCU 704 and the JTAG interface 706 on the monitor MCU 702. In at least one embodiment, a script or batch of commands is received via the WIFI module 744 and UART interface 742. The script is processed by the emulation MCU 704, and JTAG commands are routed as appropriate to the monitor MCU via the GPIO interface 730 on the emulation MCU 704 and the JTAG interface 706 on the monitor MCU 702.

FIG. 8 illustrates an example process 800 for remote debugging of industrial monitoring devices, in accordance with at least one embodiment. Although FIG. 8 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 8 are performed by one or more components of an industrial monitoring system, such as the system depicted in FIG. 1.

At 802, an industrial monitoring system facilitates the detection of a problem whose cause is undiagnosed. The problem can refer to any of a variety of issues or conditions that might affect the operation of a monitoring device. These could include issues or conditions caused by hardware malfunctions or insufficiencies, or by software malfunctions or insufficiencies. The detection of such issues may be facilitated through a variety of means. Examples of facilitation can include, but are not limited to, receiving client reports of malfunctions, analyzing events and sensor data received from a monitoring device, observing or being notified of an interruption in the operation of a monitoring device, and so forth.

At 804, the industrial monitoring system facilitates the installation of a debug-compatible component in the industrial monitoring system. This may comprise initiation of a computerized or computer-facilitated workflow that notifies an operator of the client site that installation of the debug component into a monitoring device is advised. The workflow, in at least one embodiment, facilitates shipment of the debug component to the client site. The workflow may also ensure that appropriate installation instructions are provided. Once the debugging process has been completed, the workflow may also, in at least one embodiment, provide instructions for replacing the debug-compatible component with the original component.

At 806, the industrial monitoring system causes a debugger to subscribe to communications from the debug component. As described herein, embodiments may rely on a publish-subscribe communications channel, such as one conformant to MQTT, to enable communication between a debugger and the debug component of a monitoring device. The industrial monitoring system may therefore make available, to the debugging process, the information necessary to subscribe to communications that might be sent from the debug component to its subscribers. For example, in at least one embodiment, the debugging process is provided with a unique identifier of the debug component, which is then used by the debugging process as a topic of a subscribe command issued to the publish-subscribe communications channel.

At 808, the industrial monitoring system causes the debug component to subscribe to communications from the debugger. For example, in at least one embodiment, the industrial monitoring system might provide a identifier of the debugger to the industrial monitoring device, and the industrial monitoring device might then use the identifier as a topic of a subscribe command. In other embodiments, the debug component automatically subscribes to debugging events upon startup. For example, in at least one embodiment, a startup process of the industrial monitoring device comprises an emulation MCU initializing, subscribing to debugging events via a publish-subscribe communications channel (such as MQTT), and then either continuing the startup procedure and waiting for a debug command, or halting the startup procedure and awaiting a command to continue.

At 810, the debugger publishes debugging commands to the publish-subscribe communications channel. The commands, in at least one embodiment, may include individual commands, debugging scripts, or batches of commands. The debugging commands, in at least one embodiment, are JTAG debugging commands encapsulated in MQTT messages. The debugging commands, in at least one embodiment, are published with one or more topics that identify the messages as debugging commands and identify the monitoring device that the command is directed to. Note that in some cases, a debugging command may be applicable to more than one monitoring device. For example, a topic of the debugging command might indicate a range of devices to which the command applies.

At 812, the industrial monitoring system receives and reacts to the results of the debugging commands. The results are generated by a monitoring device to which the debug command was directed. In at least one embodiment, the results are published using topics that identify the monitoring device on which the command was performed. Due to the subscription obtained through the operations described in relation to element 806, the publish-subscribe communications channel delivers the results to the debugger. The debugger can then react to the results, for example by displaying them in a user interface, logging the results, and so on.

In at least one embodiment, the operations described in relation to FIG. 8 are performed with or applied to a system other than an industrial monitoring system. For example, in at least one embodiment, the techniques described above may be performed in a system for debugging any of a variety of IoT devices, including but not limited to the described monitoring device. In cases, the described techniques may be used in relation to a system of IoT devices that performs some function other than, or in addition to, industrial monitoring.

Figure 9:
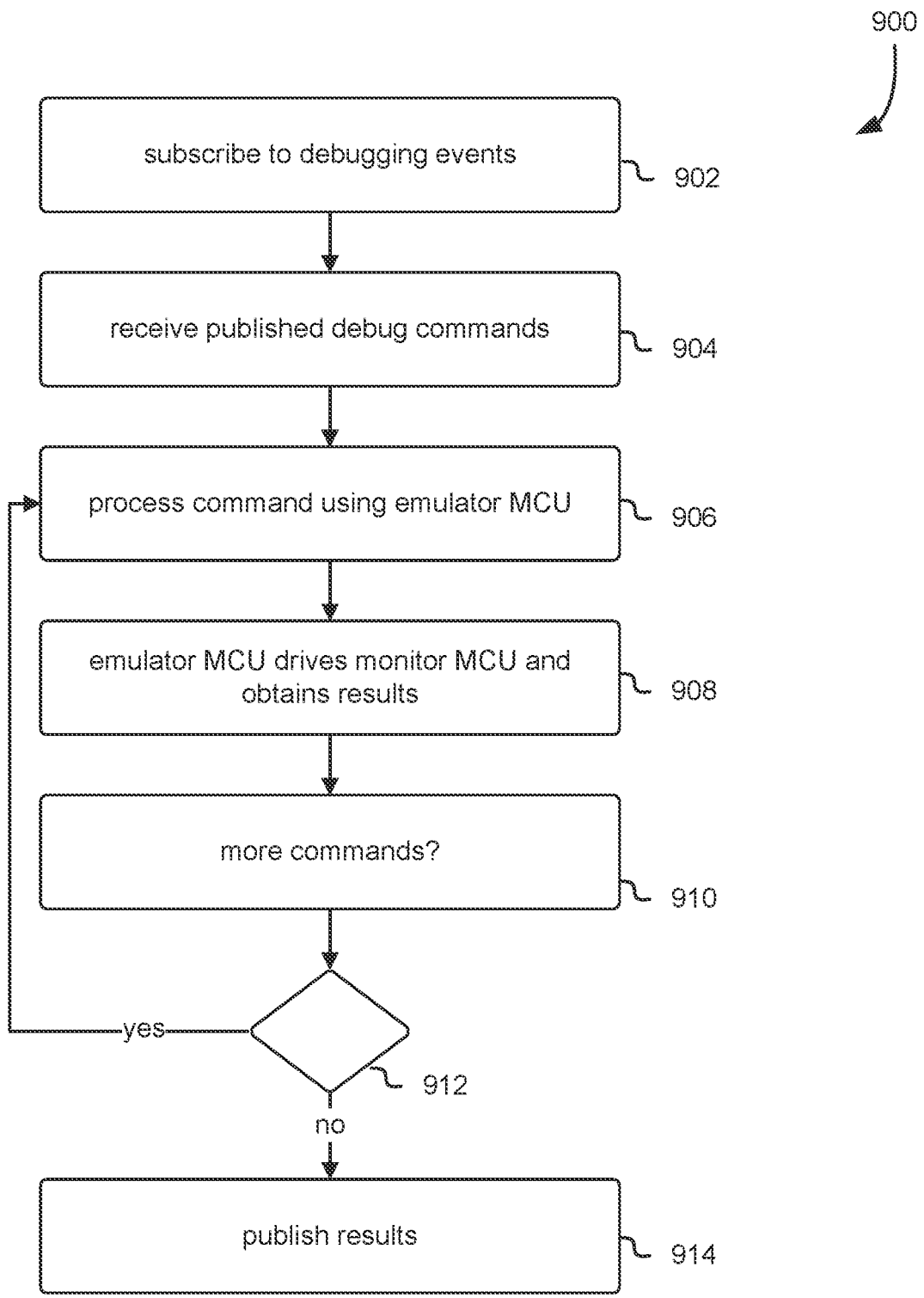
FIG. 9 illustrates an example process for performing debugging commands on an industrial monitoring device, in accordance with at least one embodiment.

FIG. 9 illustrates an example process 900 for performing debugging commands on an industrial monitoring device, in accordance with at least one embodiment. Although FIG. 9 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 9 are performed by one or a debug-compatible component of a monitoring device, such as the component 700 depicted in FIG. 7.

At 902, the component subscribes to debugging events. In at least one embodiment, this includes debugging events directed to the monitoring device that contains the component and is the intended target of a debugging session. The subscription may be performed in response to an instruction received from another element of the industrial monitoring system, or automatically, for example when the monitoring device is initialized.

At 904, the component receives published debugging commands. In at least one embodiment, the commands are received in a script or as a batch of commands. In cases and embodiments where scripts are received, the script may comprise various debugging commands interspersed with other operators or conditional expressions. These may be used, in some cases, to support conditional execution of different instructions. In at least one embodiment, the script may contain additional operations, such as operations to parse or extract portions of data.

At 906, the emulation MCU processes a command. In at least one embodiment, this comprises processing the receive data to obtain a JTAG command. In at least one embodiment, a JTAG command is extracted from MQTT data. In the case of scripts or batches of commands, the script may be extracted from MQTT data and then executed, with JTAG commands in the script extracted as executed in the indicated sequence, and according to any conditional branches of execution.

At 908, the emulation MCU drives the monitor MCU to perform the JTAG command. For example, with reference to FIG. 7, the emulation MCU may output a JTAG command to the monitor MCU via a GPIO interface on the emulation MCU that is coupled to the JTAG interface on the monitor MCU.

At 910, the emulation MCU determines whether there are more commands to process, and if so, the flow of control branches at 912 back to element 906. Otherwise, the flow of control branches to element 914.

At 914, the component publishes results of the debugging operations. In at least one embodiment, results of the debugging operation are accumulated in a memory of the emulation MCU, or a peripheral memory, during processing of the various received commands. These may then be returned, via the publish-subscribe communications channel, as published data. Note that the publish-subscribe communications channel does not explicitly connect the debugger with the monitoring device that is being debugged, but rather routes messages based on topics. The published debug data is therefore provided to the channel with topics that enable the data to be routed, by a broker or other component of the channel, to the debugger. Consequently, the monitoring device's interaction is performed without needing to wait for the debugger to confirm receipt of the data. Consistent with this technique, events comprising the results of debugging operations can be sent using asynchronous data transmission techniques. In at least one embodiment, this approach further reduces power consumption.

In at least one embodiment, the operations described in relation to FIG. 9 are performed with or applied to a system other than an industrial monitoring system. For example, in at least one embodiment, the techniques described above may be performed in a system for debugging any of a variety of IoT devices, including but not limited to the described monitoring device. In cases, the described techniques may be used in relation to a system of IoT devices that performs some function other than, or in addition to, industrial monitoring.

Figure 10:
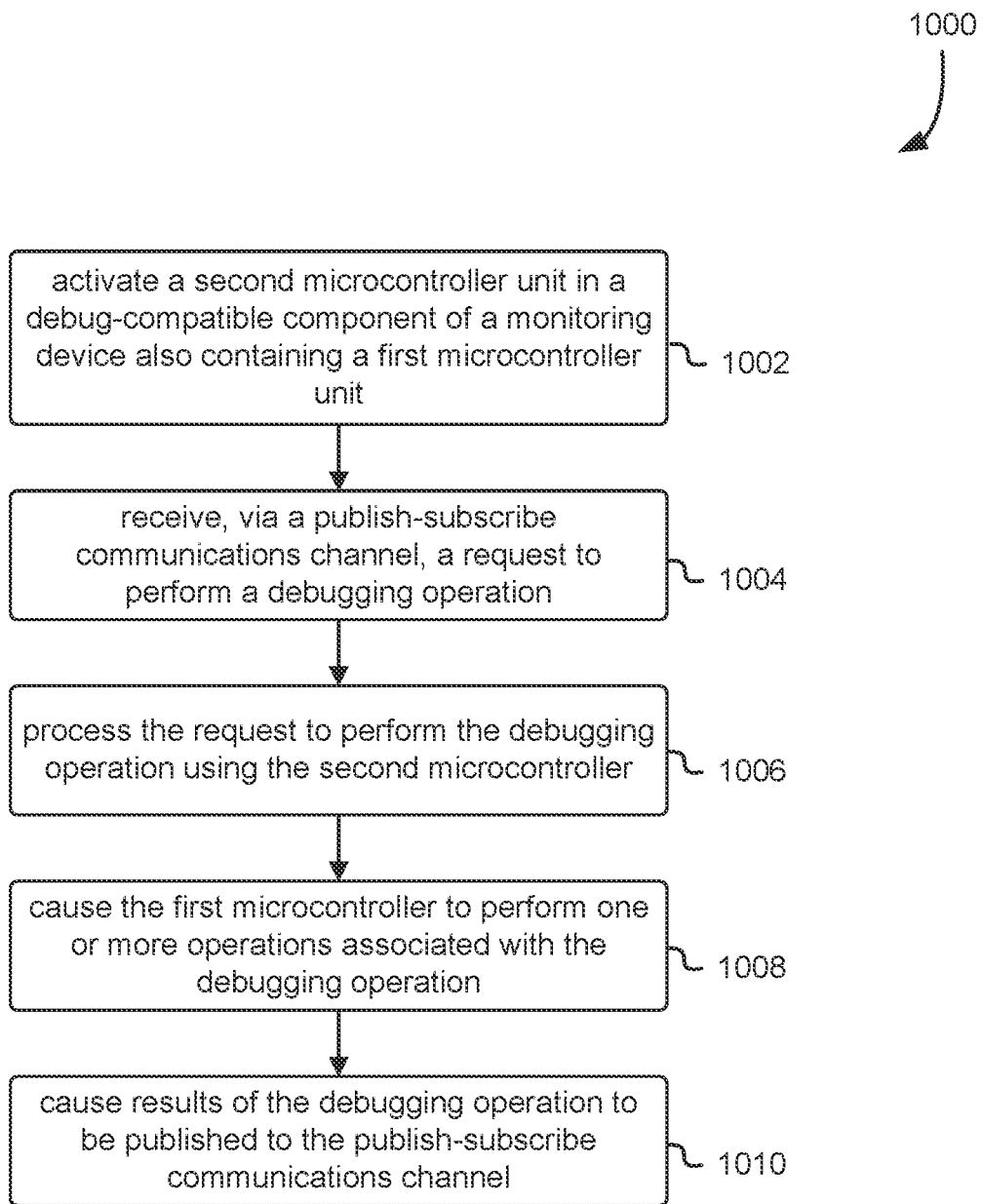
FIG. 10 illustrates a further example of a process for remote debugging of an industrial monitoring device, in accordance with at least one embodiment.

FIG. 10 illustrates a further example of a process 1000 for remote debugging of an industrial monitoring device, in accordance with at least one embodiment. Although FIG. 10 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 10 are performed by one or a debug-compatible component of a monitoring device, such as the component 700 depicted in FIG. 7. A first microcontroller, in at least one embodiment, corresponds to a monitor MCU 702, and a second microcontroller corresponds to an emulation MCU 704.

At 1002, a second microcontroller unit is activated in the debug-compatible component of a monitoring device. The debug-compatible component also comprises a first microcontroller unit which would ordinarily cause the monitoring device to perform is normal (e.g., non-debugging) functions. However, when debugging is to be performed, the second microcontroller unit is activated, and may emulate or partially perform certain functions that would ordinarily be performed by the first microcontroller. Moreover, the second microcontroller may cause various operations, such as some of those described in relation to this figure, to be performed by the monitoring device.

In at least one embodiment, activation of the second microcontroller is caused by starting, restarting, rebooting, or resetting a monitoring device that has the debug-compatible component, comprising the second microcontroller, installed.

At 1004, the monitoring device receives, via a publish-subscribe communications channel, a request to perform a debugging operation. Examples of a publish-subscribe communications channel are described herein, for example with respect to FIG. 6. In at least one embodiment, the channel comprises infrastructure, such as a publish-subscribe communications broker, to facilitate topic-based message routing. In at least one embodiment, the publish-subscribe communications are performed according to MQTT. In at least one embodiment, the debugging operation is received in the context of an interactive debugging operation. Here, interactive debugging refers to the availability of a debugging application to receive input from a user that indicates which commands to perform, and to obtain and display the output of those commands to the user. Note that here, the debugging application is not directly connected to the device being debugged, and does not maintain a direct communications channel (such as a TCP/IP connection) directly with the device. Instead, the publish-subscribe communications channel is used to enable connectionless communication of debug-related data. In at least one embodiment, this is combined with the use of debug scripts or batches. Use of these techniques may enable interactive debugging even when latency between the debugging application and the device is high.

At 1006, the monitoring device processes the request to perform the debugging operation, using the second microcontroller to process at least a portion of the request. The second microcontroller may correspond to the emulation MCU depicted in FIG. 6 or 7. Processing of the request, as described herein, can involve translation or de-encapsulation of a request transmitted to the monitoring device using MQTT. In at least one embodiment, processing of the request includes parsing and execution of a script comprising a plurality of debugging commands. Other examples of such scripts are described herein.

At 1008, the second microcontroller of the monitoring device causes the first microcontroller to perform one or more operations associated with the debugging operation. The first microcontroller may correspond to the monitor MCU depicted in FIG. 6 or 7. In at least one embodiment, the second microcontroller issues JTAG commands to the first microcontroller, as described in relation to FIG. 7.

At 1010, the second microcontroller of the monitoring device causes the results of the debugging operation to be published to the publish-subscribe communications channel. The second microcontroller, for example the emulation MCU, may obtain data, such as memory or register contents, from the first MCU, and return the data to a debugger by publishing it on the publish-subscribe communications channel.

In at least one embodiment, the operations described in relation to FIG. 8 are performed with or applied to a system other than an industrial monitoring system. For example, in at least one embodiment, the techniques described above may be performed in a system for debugging any of a variety of IoT devices, including but not limited to the described monitoring device. In cases, the described techniques may be used in relation to a system of IoT devices that performs some function other than, or in addition to, industrial monitoring.

In an example method of debugging a monitoring device component of an industrial monitoring system, the example method comprises subscribing, on a publish-subscribe communications channel, to events indicative of results of performing debugging operations; and publishing, on the communications channel, request to perform a debugging operation on a monitoring device. In the example method, the monitoring device at least receives the first event via the publish-subscribe communications channel; causes, by a second microcontroller unit of the monitoring device, one or more operations associated with the debugging operation to be performed by a first microcontroller unit of the monitoring device; and publishes, via the publish-subscribe communications channel, a second event comprising results of performing the debugging operation.

In a further aspect of the example method, the first event comprises an identifier of the monitoring device.

In a further aspect of the example method, the publish-subscribe communications channel is compliant with at least a subset of MQTT.

In a further aspect of the example method, the monitoring device of comprises a joint test action group ("JTAG") interface connected to the second microcontroller unit.

In a further aspect of the example method, a portion of the monitoring device that comprises a non-debug compatible microcontroller unit is swappable with a device comprising the first and second microcontroller units.

In a further aspect of the example method, the second microcontroller unit causes the first microcontroller unit to perform SWD commands.

In a further aspect of the example method, the method further comprises publishing, via the publish-subscribe communications channel, a script comprising instructions to execute a plurality of debugging operations on the monitoring device; and receiving, via the publish-subscribe communications channel, an event comprising a plurality of results of performing the plurality of debugging operation on the monitoring device.

In a further aspect of the example method, the publish-subscribe communications channel comprises one or more broker devices that route and filter messages based on one or more topics associated with the messages.

Figure 11:
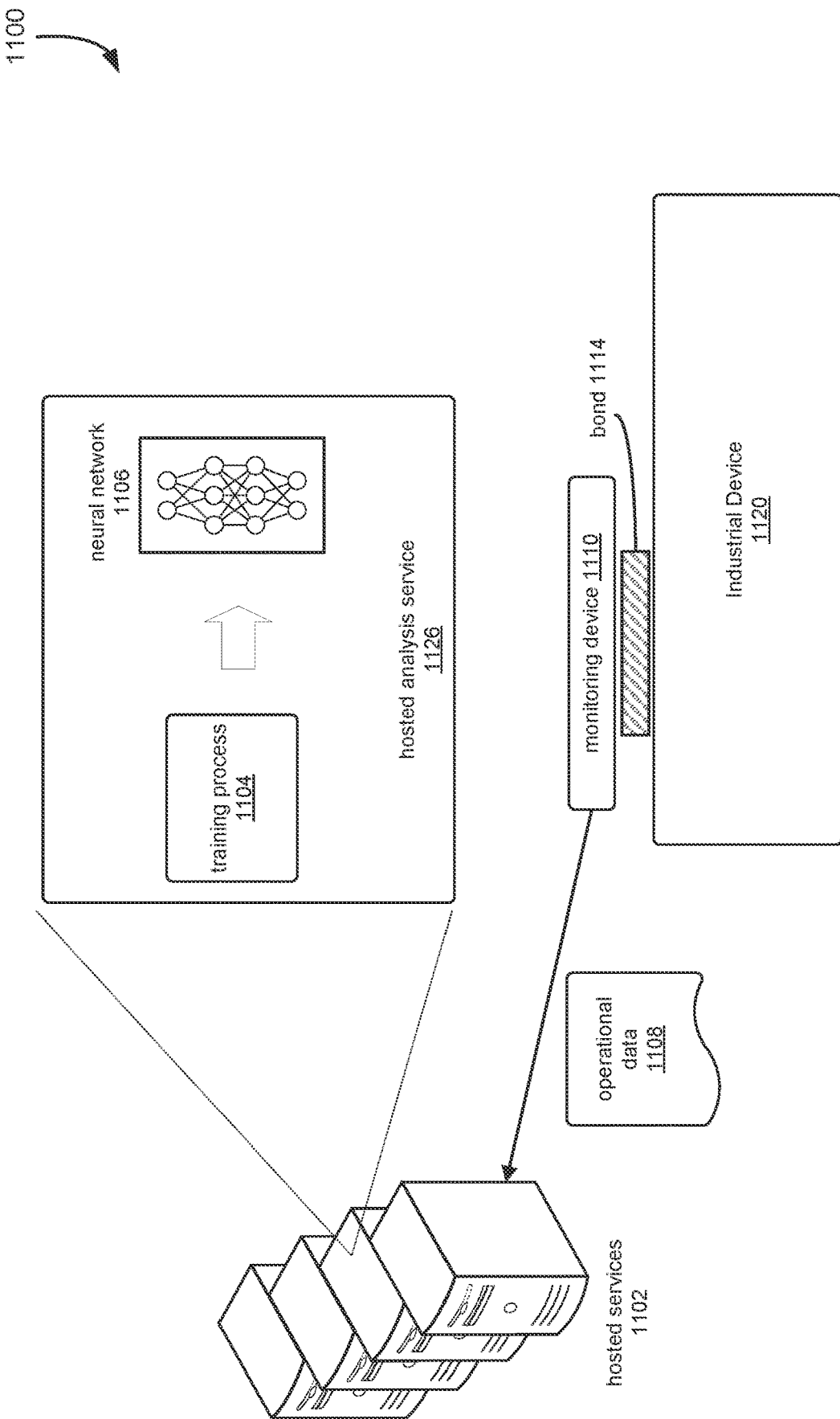
FIG. 11 illustrates an example of commissioning an industrial monitoring device, in accordance with at least one embodiment.

FIG. 11 illustrates an example of commissioning an industrial monitoring device, in accordance with at least one embodiment. The example 1100 depicts elements of an industrial monitoring system, such as a monitoring device 1110 which is connected to and monitors operation of an industrial device 1120, and which communicates with one or more hosted services 1102. These elements may correspond to the monitoring device, industrial device, and hosted services illustrated in FIG. 1.

The monitoring device 1110 is attached to the industrial device 1120 via a bond 1114. The bond 114 comprises the physical means by which the monitoring device 1110 is attached to the industrial device 1120. The bond 1114 may, for example, comprise a glue, adhesive, epoxy, or other such material. In other cases, the bond may comprise mechanical devices, such as screws or clamps.

A problem that may arise in the operation of an industrial monitoring system is that, regardless of the particular attachment mechanism used, the bond 1114 may weaken or break over time. This can, for example, be a consequence of the vibrations and temperature changes often caused by operation of the industrial device, or to other effects, such oxidation or ordinary wear-and-tear. A weakening or breaking of the bond 1114, when it occurs, can interfere with the proper collection of data by the monitoring device 1110.

In at least one embodiment, the breaking or weakening of a bond 1114 is detected using a neural network 1106, or other machine learning model, trained to predict various characteristics of the sensor data collected by the monitoring device 1110. This training occurs, in at least one embodiment, during a commissioning period initiated after the monitoring device 1110 has been attached to the industrial device 1120 and the bond 1114 is known to be in a normal state. During this period, the monitoring device 1110 collects sensor data during normal operation of the industrial device 1120. Here, normal operation refers to typical usage patterns for the industrial device 1120, which can include periods of activity and inactivity. For example, while the commissioning period is ongoing, the industrial device 1120 might be operative during working hours and inoperative during non-working hours. Similarly, there might be different patterns of usage that tend to occur during working hours, as might occur when the industrial device 1120 is used more frequently or when it is put to different uses.

During the commissioning period, the monitor device 1110 obtains data and transmits it, as operational data 1108, to the hosted services 1102. The transmission may occur through various means, such as through the gateways and network depicted in FIG. 1. The operational data 1108 may comprise sensor data, such as temperature data and vibration data, collected over time by the sensors of the monitoring device 1110. The sensor data may exhibit various patterns or other characteristics which can potentially be predicted by the neural network 1106.

In at least one embodiment, a hosted analysis service 1226 trains the neural network 1108, using the operational data 1108, to predict future characteristics of the sensor data. In at least one embodiment, the training process 1104 uses current operational data to predict a future characteristic, and then validate the prediction when the time associated with the prediction arrives. During the commissioning period, the bond 1114 may be assumed to be in a normal state.

The neural network 1106 may be trained, in embodiments, to predict any one or more of a variety of characteristics. Examples of such characteristics that include, but are not limited to, temperature, rate of temperature change, and vibration frequencies. In at least one embodiment, the prediction is based on time, so that a characteristic of the operational data, as of some future time, can be predicted. For example, the neural network can be trained to predict an expected temperature of the industrial device as of a particular time of day, or at some point N hours into the future.

The neural network 1106 can also be trained to predict a future characteristic based on a current characteristic. For example, in at least one embodiment, the neural network predicts a future temperature value given input that indicates the current temperature. This prediction, in some instances, can be made in light of the operational status (e.g., on or off) of the industrial device 1120. For example, the neural network 1106 could be trained to predict the temperature of the device ten minutes after shutoff of the industrial device 1120. In at least one embodiment, these predictions are based on the assumption that the bond 1114 remains in a normal state. Embodiments may then use these "normal state" predictions in comparison to an actual state, in order to identify a potential weakening or breaking of the bond 1114.

The neural network 1106 can also be trained to classify operational data as normal or abnormal. Using this approach, the neural network 1106 is trained based on the assumption that operational data 1106, collected during the commissioning period, is normal. Later, after the commissioning period, the neural network can determine if current operational data reflects the same characteristics that were embedded in the neural network's latent space during the training period.

Figure 12:
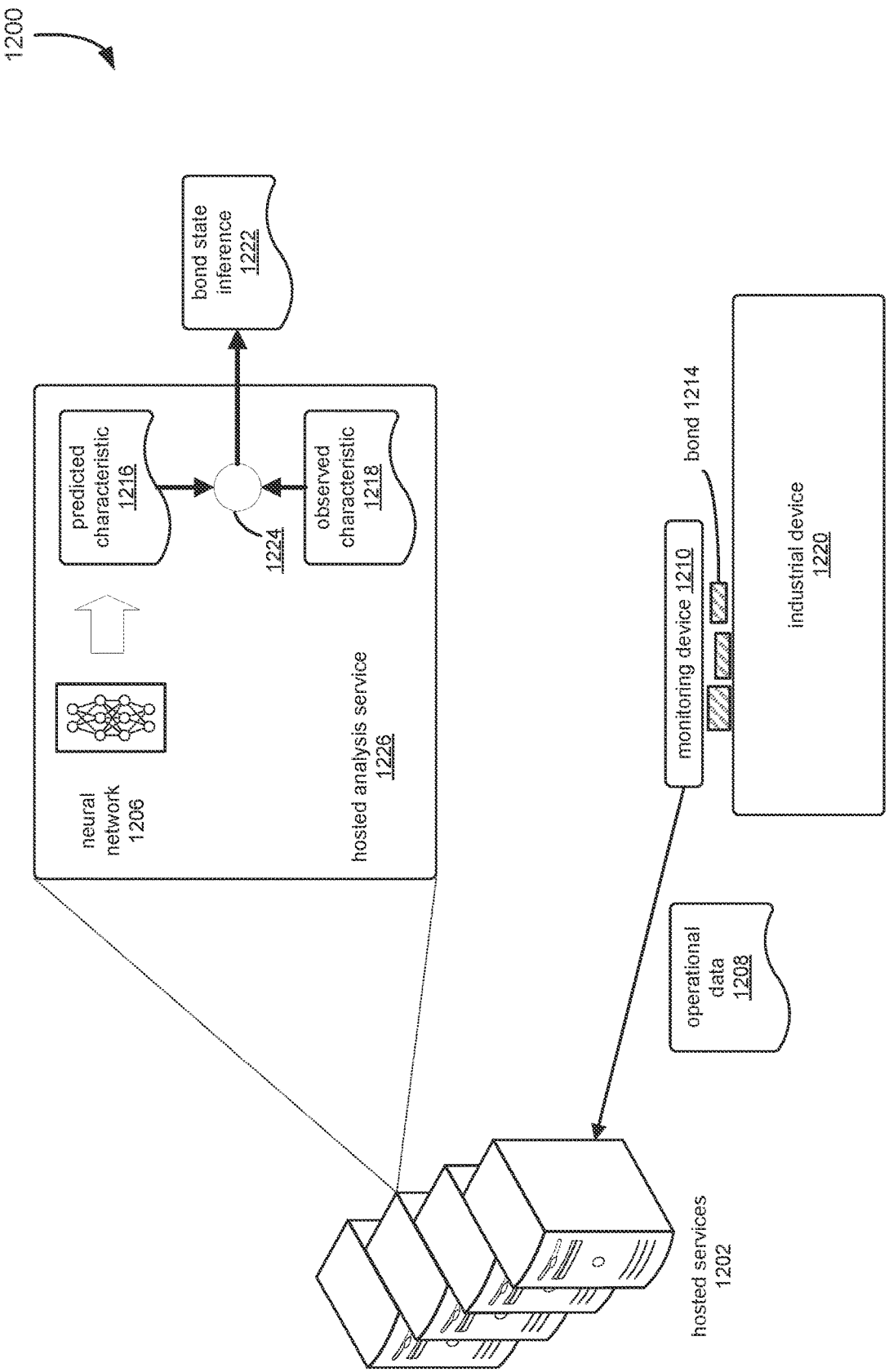
FIG. 12 illustrates an example of an industrial monitoring system detecting a degraded or broken bond between a monitoring device and an industrial device, in accordance with at least one embodiment.

FIG. 12 illustrates an example of an industrial monitoring system detecting a degraded or broken bond between a monitoring device and an industrial device, in accordance with at least one embodiment. The example 1200 of FIG. 12 depicts hosted services 1202, industrial device 1220, and monitoring device 1210 that correspond to those devices as depicted in FIG. 11. The depicted hosted analysis service 1226 is one of the hosted services 1202, and corresponds to the hosted analysis service 1126 depicted in FIG. 1. The neural network 1206 is a trained version of neural network 1106. The bond 1214 corresponds to the bond 1114 depicted in FIG. 11, but is, for the purposes of the example, considered to have been degraded or broken at some point after the commissioning period described in relation to FIG. 11.

In at least one embodiment, monitoring device 1210 collects and transmits operational data 1208. As was the case in FIG. 11, the operational data 1208 may comprise sensor data collected over time by the sensors of the monitoring device 1110. The operational data 1208 may reflect the various usage patterns that occurred during the commissioning period. The operation data 1208 may also reflect weakening of the bond 1214, but not necessarily in ways that could be detected by ordinary analysis. For example, the effects of the weakening or broken bond on temperature or vibration data may not be observable due to periodic variations, variations caused by the location of placement of the monitoring device 1210 on the industrial device 1220, the nature of the bonding material, the initial quality of the bond, and so forth. In at least one embodiment, these problems are be addressed, at least in part, by using the neural network 1206 to predict the changing characteristics of the sensor data when the bond is presumed to be in a normal state, and by further comparing the prediction with an observed characteristic.

In at least one embodiment, the hosted analysis service 1226 uses the trained neural network 1206 to obtain an inferred or predicted characteristic 1216. In at least one embodiment, the inferred or predicted characteristic 1216 comprises one or more of a predicted temperature, a predicted rate of change of temperature, a frequency spectrum, or a rate of change in a frequency spectrum. The inferred or predicted characteristic 1216 is then compared, by a comparison module 1224, with an observed characteristic 1218. The comparison module 1224 then outputs a bond state inference 1222.

The comparison module 1224, in at least one embodiment, comprises software and/or hardware that, when activated (e.g., by execution of the software by one or more processors), compares or otherwise analyzes differences between the inferred characteristic 1216 and the observed characteristic 1218.

In at least one embodiment, the comparison module 1224 compares an expected temperature, as indicated by the inferred or predicted characteristic 1216, with an observed temperature change, as indicated by observed characteristic 1218.

In at least one embodiment, the comparison module 1224 compares an expected rate of temperature change, as indicated by the inferred or predicted characteristic 1216, with an observed rate of temperature change, as indicated by observed characteristic 1218.

In at least one embodiment, the comparison module 1224 compares an expected frequency spectrum, as indicated by the inferred or predicted characteristic 1216, with an observed frequency spectrum, as indicated by observed characteristic 1218.

In at least one embodiment, the comparison module 1224 comprises a neural network trained to perform analysis and comparison of expected an actual characteristics of the data. In some instances, this may be the same neural network 1206 whose training was described in relation to FIG. 11, or a superset of this neural network. For example, in at least one embodiment, a portion of the neural network is pre-trained to perform the comparison, and another portion is subsequently trained, during commission, to perform predictions.

In another embodiment, the neural network 1206 is trained during commissioning to classify operational data as having normal or abnormal characteristics. The hosted analysis service 1226 may omit, in this embodiment, several of the elements depicted in FIG. 12, such as the generation of a predicted characteristic 1216 or the use or presence of the comparison module 1224. In this embodiment, the neural network 1206 is provided with input obtained from the operational data 1208, such as the observed characteristics 1218, and proceeds to classify the data as indicative of normal or abnormal operation, resulting in bond state inference 1222.

Figure 13:
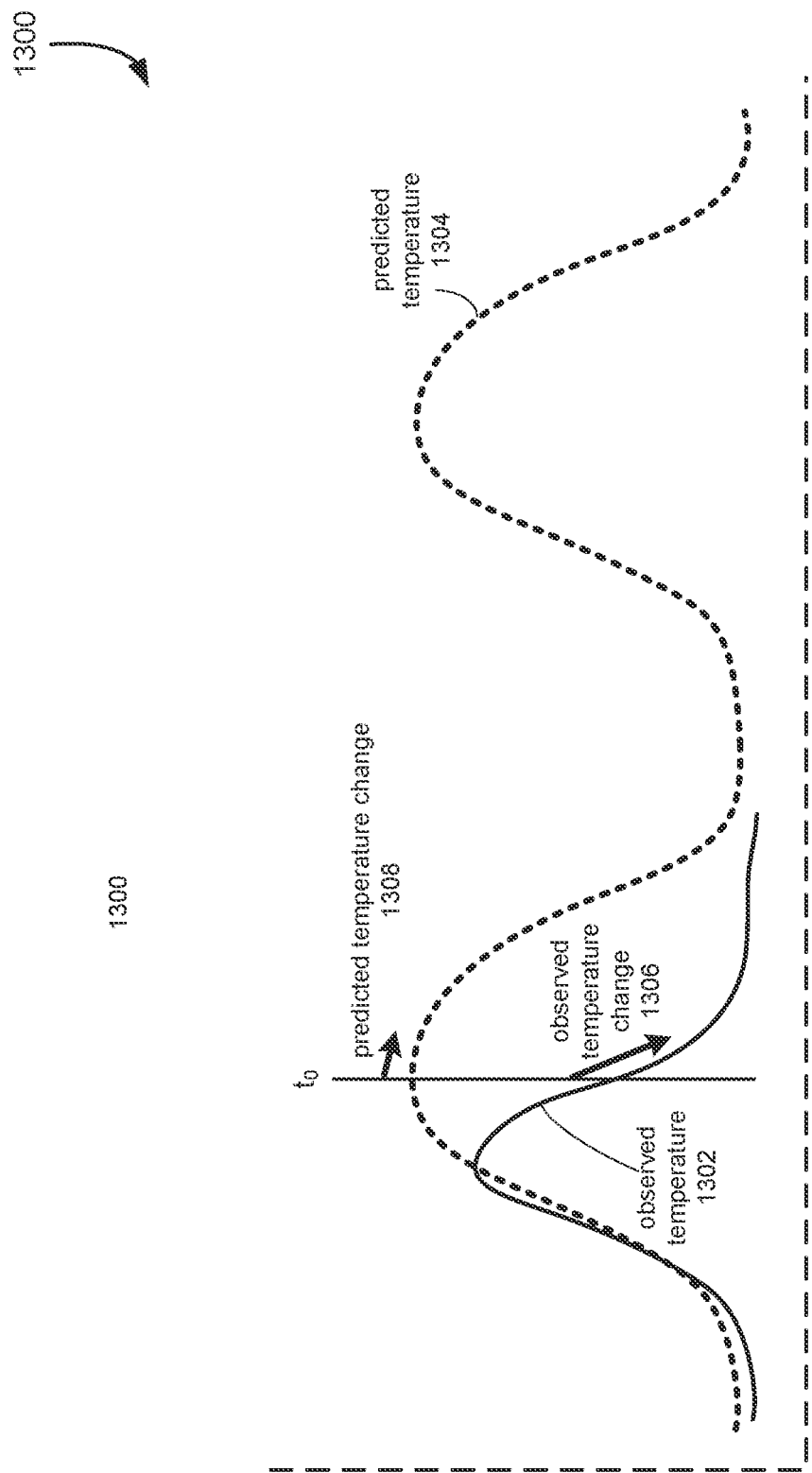
FIG. 13 illustrates an example of a predicted characteristic of a metric, in accordance with at least one embodiment.

FIG. 13 illustrates an example of a predicted characteristic of a metric, in accordance with at least one embodiment. In the example 1300 of FIG. 13, a predicted temperature 1304 is indicative of temperature sensor data collected by a monitoring device during a commissioning period. The monitoring device is presumed, during this period, to be properly attached to the industrial device that is the subject of monitoring. In the example 1300, the predicted temperature 1304 fluctuates over time.

An associated characteristic of the predicted temperature 1304 is a predicted temperature change 1308. For example, the slope of the predicted temperature 1304 as of a time to can be considered to be a characteristic of the predicted temperature 1304.

Similarly, an associated characteristic of an observed temperature 1302 can include an observed temperature change 1306. This data may reflect temperature data collecting from a monitoring device after its commissioning period, where the state of the bond between the monitoring device and industrial device is no longer be presumed to be normal.

In at least one embodiment, comparison of the predicted temperature change 1308 and the observed temperature change 1306 is used to infer that the bond between a monitoring device and industrial device has been degraded or weakened. For example, when an industrial device is shut off, the temperature measured by a monitoring device may be expected, in at least some cases, to decline more rapidly when the bond between the monitoring device and the industrial device has been weakened or has broken. Similarly, the temperature may decline more slowly when the bond is in a normal state. Note that in practice, the temperature observed temperature patterns may be considerably more complex than is depicted in FIG. 13, since the temperature observed by a monitoring device at a client site can reflect not only the industrial device to which the monitoring device is attached, but also to the ambient environment and other potential factors, such as heat emanating from other industrial devices, which can influence the temperature recorded by the sensor and the rate at which temperature increases or decreases.

Figure 14:
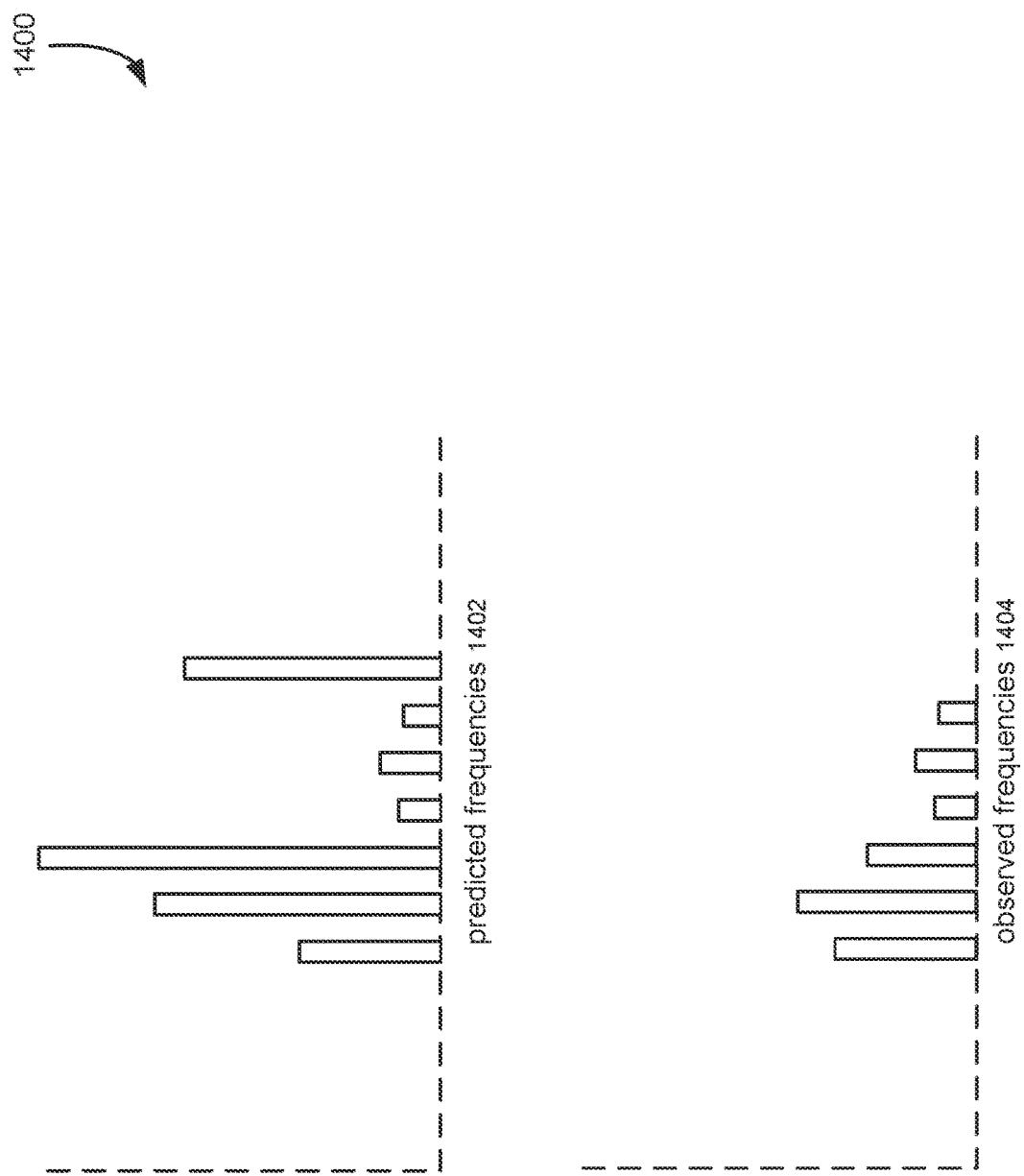
FIG. 14 illustrates a further example of predicting a characteristic of a metric, in accordance with at least one embodiment.

FIG. 14 illustrates a further example of predicting a characteristic of a metric, in accordance with at least one embodiment. The example 1400 shows the predicted and observed frequencies of vibration data collected from an industrial monitoring device. The predicted frequencies 1402, in at least one embodiment, could include a frequency distribution predicted for a given time to, or for a certain state (for example, an "on" state) of the industrial device. As described herein, these characteristics might be predicted by training a neural network to identify frequency patterns during a commissioning period. The frequency spectrum data may be obtained from any of a variety of signals, such as signals indicative of vibration, electromagnetic waves, and acoustic waves.

The observed frequencies 1404, in at least one embodiment, could include a frequency distribution observed at a given time subsequent to the commissioning period. During similar operating periods or operating states, these frequencies may be expected to be similar. However, in practice, identifying the similar patterns may be quite difficult, due to the likelihood of transient frequencies, interference from other devices which may operate, and so on. Similarly, there may be detectable differences between the predicted and observed frequencies when the bond state has deteriorated. This could be due, in part, to certain frequencies being conducted more or less efficiently through the bond when the bond is in a deteriorating state.

Figure 15:
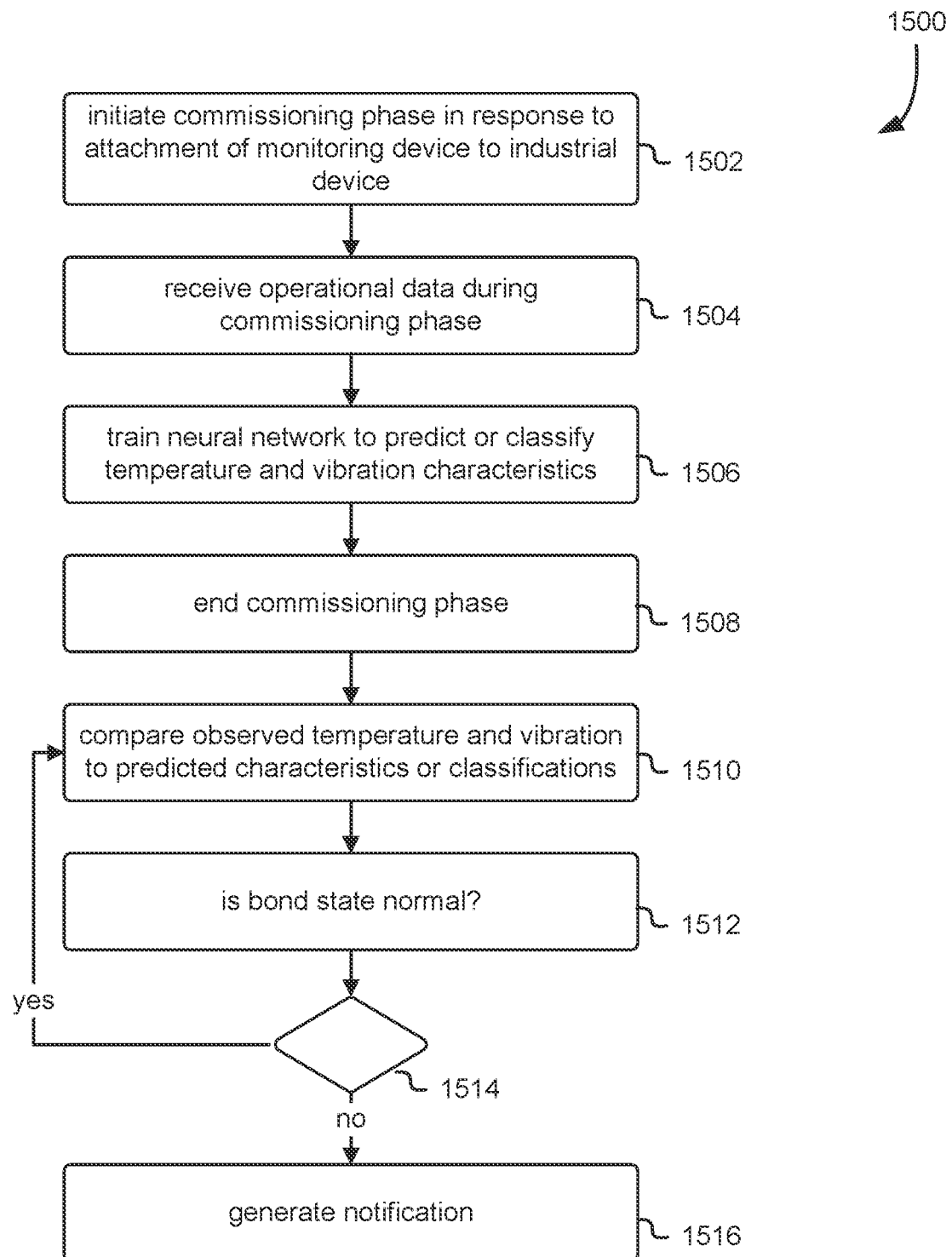
FIG. 15 illustrates an example process of detecting a change to the state of a bond between a monitoring device and an industrial device, in accordance with at least one embodiment.

FIG. 15 illustrates an example process 1500 of detecting a change to the state of a bond between a monitoring device and an industrial device, in accordance with at least one embodiment. Although FIG. 15 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 15 are performed by one or more components of an industrial monitoring system, such as the system depicted in FIG. 1. In at least one embodiment, the operations depicted in relation to FIG. 15 are performed by a hosted computing service, such as one of the hosted computing services depicted in FIG. 1. In at least one embodiment, the hosted computing service is a hosted analysis service such as the hosted analysis service depicted in FIGS. 11 and 12. Note that although the operations of FIG. 15 are described as being performed by one or more hosted services, potential embodiments may include those which perform the depicted operations in different configurations. For example, certain of the described operations may be performed by the industrial device instead of by the hosted services.

At 1502, the hosted services initiate a commissioning phase in response to attachment of a monitoring device to an industrial device. During this period, the bond state is presumed to be normal. In some instances, the hosted services will transmit instructions or other facilitating information to a user interface viewable by personnel at the industrial site, in order to facilitate bonding of monitoring devices to industrial devices, and to obtain information to indicate that the commissioning phase may begin.

At 1504, the hosted services receive operational data during the commissioning phase. Examples of this process are described herein, including in relation to FIG. 11. The hosted services receive operational data, such as temperature and vibration data, collected by the monitoring device, to use in training a neural network. Accordingly, at 1506, the hosted services trains a neural network, or other machine learning model, to predict or classify temperature or vibration characteristics. As described herein, these characteristics can include periodic variations, frequency spectrum, rate of temperature change, and so forth. They can also include classifications, such as classifications of normal or abnormal operating state.

At 1508, the commissioning phase ends. After this point, the monitoring device continues to collect data, and this data is used to perform the various functions of the industrial monitoring system. In addition, the data is used to detect potential weakening of the bond between the monitoring device and the industrial device.

At 1510, additional operational data, such as temperature and vibration data, is received and is compared to predicted characteristics or classifications. As described herein, for example in relation to FIGS. 11-14, the predicted characteristics or classifications may be compared to characteristics or classifications of the current operational data to reveal potential weakening or breaking of the bond state. In general terms, the characteristics or classifications of the current operational data should be similar to the predicted characteristics if the bond state is normal. For example, in at least one embodiment, the rate of observed temperature decline would be expected to be similar to the predicted rate.

At 1512, a determination is made, based on the comparisons or classifications, regarding whether the bond state is normal. At 1514, control reverts again to 1510 if the bond state is normal, and collection and analysis of the sensor data repeats. Otherwise, a notification of the failed bond state is generated at 1516. Note that in some embodiments, a direct inference can be made regarding the bond state based on factors such as the rate of temperature decay or a change in the frequency characteristics of a signal. In at least one embodiment, a direct inference is made in conjunction with some characteristic predicted using the neural network. In at least one embodiment, the determination is made by comparing a signal characteristic predicted by the machine learning model with an observed signal characteristic indicated by the second data. Examples of such signals may include vibration data, or any other signal type. Examples of such signal characteristics may include, but is not limited to, frequency, frequency spectrum, various statistical characteristics, and so forth.

Figure 16:
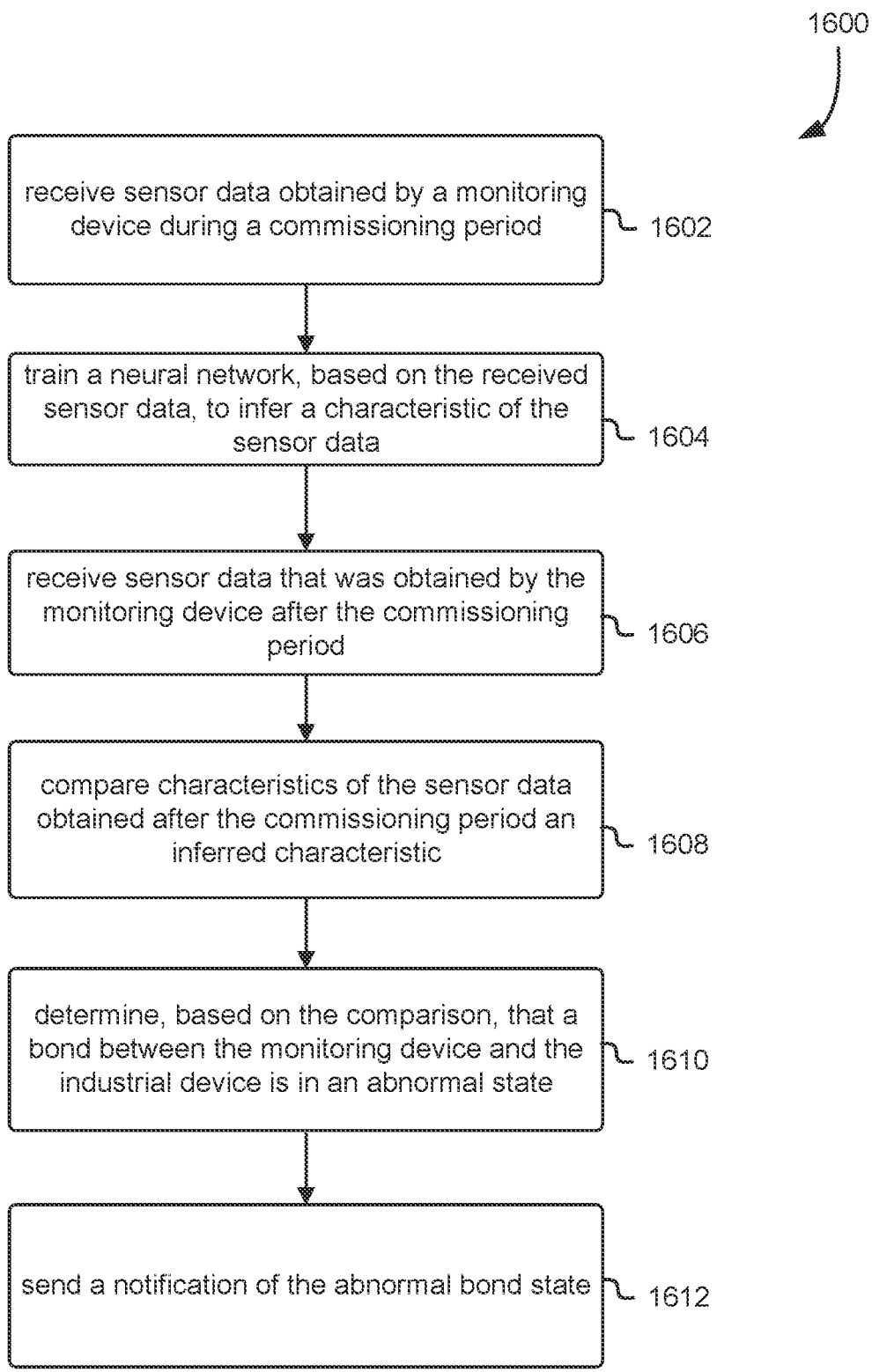
FIG. 16 illustrates a further example of a process of detecting a change to the state of a bond between a monitoring device and an industrial device, in accordance with at least one embodiment.

FIG. 16 illustrates a further example of a process 1600 of detecting a change to the state of a bond between a monitoring device and an industrial device, in accordance with at least one embodiment. Although FIG. 16 is depicted as a sequence of operations, the depicted sequence may, in various embodiments, be altered or reordered, except where the depicted sequence is logically required, such as when the input of one operation requires the output of an earlier operation. In various embodiments, the depicted operations may be performed in parallel. The depicted operations may, in at least one embodiment, be performed by a computing system comprising at least one processor and a memory comprising instructions that, when executed by the at least one processor, cause the computing system to perform the depicted operations. In at least one embodiment, the computing system is a distributed computing system, comprising a number of individual computing devices, each with its own set of processors and memory, but operating cooperatively to perform the depicted operations.

In at least one embodiment, the operations depicted in relation to FIG. 16 are performed by one or more components of an industrial monitoring system, such as the system depicted in FIG. 1. In at least one embodiment, the operations depicted in relation to FIG. 16 are performed by a hosted computing service, such as one of the hosted computing services depicted in FIG. 1. In at least one embodiment, the hosted computing service is a hosted analysis service such as the hosted analysis service depicted in FIGS. 11 and 12. Note that although the operations of FIG. 15 are described as being performed by one or more hosted services, potential embodiments may include those which perform the depicted operations in different configurations. For example, certain of the described operations may be performed by the industrial device instead of by the hosted services.

At 1602, the hosted service receives sensor data that was obtained by a monitoring during a commissioning period. In at least one embodiment, the commissioning period is initiated subsequent to bonding the monitoring device to an industrial device. During this time, the bond between the monitoring device and the industrial device is presumed to be normal.

At 1604, the hosted service trains a neural network, based on the sensor data received during the commissioning period, to infer a characteristic of the sensor data.

At 1606, additional sensor data is received from the monitoring device. This data is received after the commissioning period, in what could be described as a monitoring period, during which the industrial monitoring system monitors the behavior of industrial devices at the client site, and may also, as described with respect to this figure, attempt to identify changes to the state of the bond between the monitoring device and the industrial device.

At 1608, the hosted services compare compares characteristics of the more recently-obtained sensor data (the sensor data received during the monitoring period) with an inferred characteristic of the sensor data.

At 1610, the hosted services determine, based on the comparison, that a bond between the monitoring device and the industrial device is in an abnormal state, and at 1612, the hosted services generate and send a notification of the abnormal bond state.

In at least one embodiment, an example method of detecting a change to the state of a bond between a monitoring device and an industrial device comprises receiving first data indicative of a metric obtained by a monitoring device, the monitoring device attached by a bond to an industrial device, the first data obtained by the monitoring device during a first time period; training a machine learning model, based at least in part on the first data, to infer a characteristic of the metric; receiving second data indicative of the metric, the second data obtained by the monitoring device during a second time period; determining, based at least in part on the second data and an inferred characteristic of the metric, that the bond state has changed; and generating a notification of the changed state of the bond.

In a further aspect of the example method, the first data exhibits periodic fluctuations in values of the metric.

In a further aspect of the example method, the changed state of the bond comprises at least one of weakening of the bond between the monitoring device and the industrial device or separation of the monitoring device from the industrial device.

In a further aspect of the example method, the inferred characteristic is a rate of temperature change.

In a further aspect of the example method, the method further comprises identifying the changed state of the bond by at least comparing the inferred temperature gradient with an observed temperature gradient indicated by the second data.

In a further aspect of the example method, the inferred characteristic is a frequency spectrum of the metric.

In a further aspect of the example method, the method further comprises identifying the changed state of the bond by at least comparing the inferred frequency spectrum with an observed frequency spectrum indicated by the second data.

In a further aspect of the example method, the method further comprises sending instructions to reattach the monitoring device to the industrial device; and causing the monitoring device to enter a commissioning period subsequent to reattachment.

Figure 17:
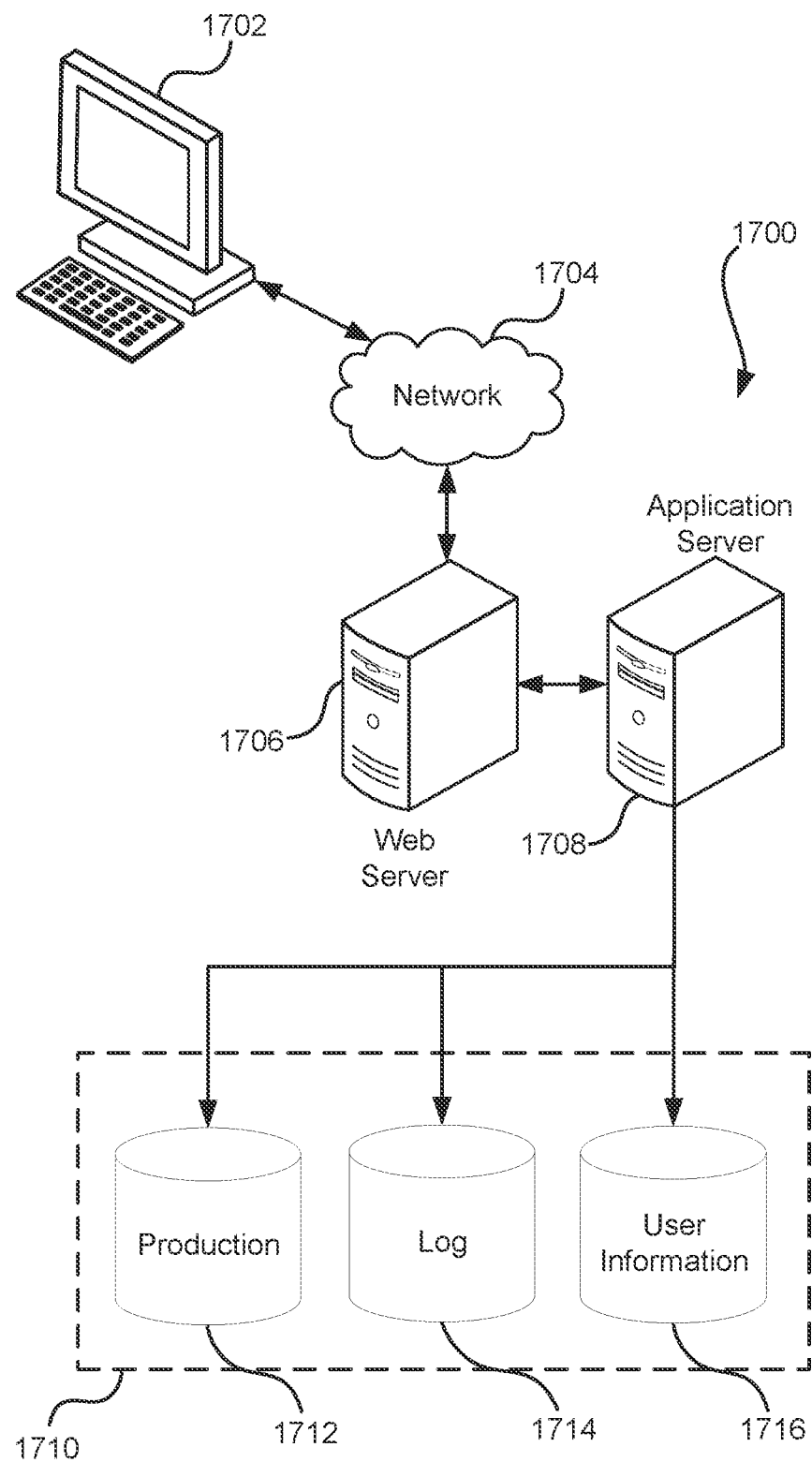
FIG. 17 illustrates a system in which various embodiments can be implemented.

FIG. 17 illustrates aspects of an example system 1700 for implementing aspects in accordance with an embodiment of the systems, methods, or computer program products described herein. As will be appreciated, although a web-based system is used for purposes of explanation, different systems may be used, as appropriate, to implement various embodiments. In an embodiment, the system includes an electronic client device 1702, which includes any appropriate device operable to send and/or receive requests, messages, or information over an appropriate network 1704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1706 for receiving requests and serving content in response thereto, although for other networks an alternative device serving a similar purpose could be used as would be apparent to one of ordinary skill in the art.

In an embodiment, the illustrative system includes at least one application server 1708 and a data store 1710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1702 and the application server 1708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1712 and user information 1716, which are used to serve content for the production side. The data store also is shown to include a mechanism for storing log data 1714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1710.

The data store 1710, in an embodiment, is operable, through logic associated therewith, to receive instructions from the application server 1708 and obtain, update or otherwise process data in response thereto, and the application server 1708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1702. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A gateway device, comprising:
   at least one processor; and
   at least one memory comprising instructions that, in response to execution by the at least one processor, cause the gateway device to at least:
      receive, via a first wireless transmission, a request from a monitoring device to communicate with any one of a plurality of gateway devices, the plurality of gateway devices comprising the gateway device;
      determine a signal quality of the first wireless transmission;
      calculate a wait time based, at least in part, on the signal quality, wherein at least a portion of the wait time is inversely proportional to the signal quality;
      receive, via a wireless transmission after the wait time has elapsed, a subsequent request from the monitoring device to communicate with the gateway device;
      determine the calculated wait time has elapsed and the subsequent request has been received; and
      in response to the determination that the calculated wait time has elapsed, send, via a second wireless transmission, a message indicative of acceptance of the request and the subsequent request to communicate.

2. The gateway device of claim 1, wherein the wait time comprises a randomized delay period scaled in inverse proportion to the signal quality.

3. The gateway device of claim 1, wherein the plurality of gateway devices are in wireless transmission range of the monitoring device.

4. The gateway device of claim 1, wherein the first and second wireless transmissions are compatible with BLUETOOTH transmissions.

5. The gateway device of claim 1, wherein the message indicative of acceptance of the request is sent in response to receipt of the subsequent request to communicate.

6. A method, comprising:
   receiving, at a gateway of a plurality of gateways, a first wireless transmission indicative of a request from a monitoring device to communicate with any one of the plurality of gateways;
   calculating, by the gateway, a wait time based, at least in part, on signal quality of the first wireless transmission, wherein at least a portion of the wait time is inversely proportional to the signal quality;
   receiving, at the gateway, a subsequent request from the monitoring device to communicate with the gateway after the wait time has elapsed;
   determining the calculated wait time has elapsed and the subsequent request has been received; and
   in response to the determining that the calculated wait time has elapsed, sending, via a second wireless transmission sent from the gateway after the wait time has elapsed, a message indicative of acceptance of the request and the subsequent request from the monitoring device to communicate.

7. The method of claim 6, further comprising:
   calculating the wait time to include a randomized delay period weighted in inverse proportion to the signal quality.

8. The method of claim 6, wherein the plurality of gateways are in wireless transmission range of the monitoring device.

9. The method of claim 6, wherein the monitoring device periodically transmits additional requests to communicate with any one of the plurality of gateways.

10. The method of claim 6, further comprising:
    responding to an additional request to communicate with any one of the plurality of gateways by at least determining that the wait time has elapsed and sending the second wireless transmission.

11. The method of claim 6, further comprising:
    receiving, from the monitoring device, information obtained based, at least in part, on a sensor included in the monitoring device.

12. The method of claim 6, further comprising:
    receiving sensor information from the monitoring device, the sensor information received after acceptance of the request from the monitoring device; and
    sending the sensor information to a remote service.

13. The method of claim 6, wherein power consumption of the monitoring device is reduced based, at least in part, on delaying transmission of the message indicative of acceptance of the request to communicate.

14. A non-transitory computer-readable storage medium comprising instructions that, in response to execution by at least one processor of a computing device, cause the computing device to at least:
- receive a first wireless transmission indicative of a request from a monitoring device to communicate with any one of a plurality of gateways;
- calculate a wait time based, at least in part, on signal quality of the first wireless transmission, wherein at least a portion of the wait time is inversely proportional to the signal quality;
- receive, after the wait time has elapsed, a second wireless transmission indicative of a second request from the monitoring device to communicate with the gateway;
- determine the calculated wait time has elapsed and the second request has been received; and
- send, based at least in part on the determination that the calculated wait time has elapsed, via a second wireless transmission sent after the wait time has elapsed, a message indicative of acceptance of the request and the second request from the monitoring device.

15. The non-transitory computer-readable storage medium of claim 14, comprising further instructions that, in response to execution by the at least one processor, cause the computing device to at least:
- calculate the wait time to include a randomized delay period weighted in inverse proportion to the signal quality.

16. The non-transitory computer-readable storage medium of claim 14, wherein the plurality of gateways are in wireless transmission range of the monitoring device.

17. The non-transitory computer-readable storage medium of claim 14, wherein the monitoring device periodically transmits additional requests to communicate with any one of the plurality of gateways.

18. The non-transitory computer-readable storage medium of claim 14, comprising further instructions that, in response to execution by the at least one processor, cause the computing device to at least:
- respond to an additional request to communicate with any one of the plurality of gateways by at least determining whether the wait time has elapsed and sending the second wireless transmission.

19. The non-transitory computer-readable storage medium of claim 14, comprising further instructions that, in response to execution by the at least one processor, cause the computing device to at least:
- receive, from the monitoring device, information obtained based, at least in part, on a sensor included in the monitoring device.

20. The non-transitory computer-readable storage medium of claim 14, comprising further instructions that, in response to execution by the at least one processor, cause the computing device to at least:
- receive sensor information from the monitoring device, the sensor information received after acceptance of the request from the monitoring device; and
- send the sensor information to a remote service.

* * * * *